United States Patent
Takada et al.

(10) Patent No.: US 11,563,393 B2
(45) Date of Patent: Jan. 24, 2023

(54) CONTROL DEVICE FOR ROTARY APPARATUS, ROTARY APPARATUS, AND CONTROL METHOD FOR ROTARY APPARATUS

(71) Applicant: MINEBEA MITSUMI Inc., Nagano (JP)

(72) Inventors: Kazuo Takada, Kosai (JP); Takayuki Matsui, Toyohashi (JP); Haruka Miyaji, Toyohashi (JP); Hideo Sano, Saitama (JP)

(73) Assignee: MINEBEA MITSUMI Inc., Nagano (JP)

( * ) Notice: Subject to any disclaimer, the term of this patent is extended or adjusted under 35 U.S.C. 154(b) by 163 days.

(21) Appl. No.: 17/120,592

(22) Filed: Dec. 14, 2020

(65) Prior Publication Data

US 2021/0194399 A1    Jun. 24, 2021

(30) Foreign Application Priority Data

Dec. 20, 2019  (JP) .............................. JP2019-230454
Jul. 13, 2020   (JP) .............................. JP2020-120108

(51) Int. Cl.
| | |
|---|---|
| H02P 8/00 | (2006.01) |
| H02P 8/34 | (2006.01) |
| H02K 37/24 | (2006.01) |
| H02K 11/21 | (2016.01) |
| H02K 7/116 | (2006.01) |

(52) U.S. Cl.
CPC ................ H02P 8/34 (2013.01); H02K 7/116 (2013.01); H02K 11/21 (2016.01); H02K 37/24 (2013.01)

(58) Field of Classification Search
CPC ........ H02K 11/21; H02K 7/116; H02K 37/24; H02P 8/34; H02P 8/00; H02P 8/18
See application file for complete search history.

(56) References Cited

U.S. PATENT DOCUMENTS

2019/0190352 A1    6/2019    Miyaji et al.

FOREIGN PATENT DOCUMENTS

| CN | 102892673 A | * | 1/2013 | ........... B64C 25/405 |
| CN | 103802659 A | * | 5/2014 | ............. B60K 11/04 |
| CN | 108725269 A | * | 11/2018 | ............... B60N 2/14 |
| JP | 2018-038250 A | | 3/2018 | |

* cited by examiner

*Primary Examiner* — Karen Masih
(74) *Attorney, Agent, or Firm* — Pearne & Gordon LLP

(57) ABSTRACT

A control device 10 for a rotary apparatus 1 includes a driving circuit 40 configured to apply a driving voltage to a stepping motor 20 that rotates an output gear 74, and a control circuit 30 configured to output, to the driving circuit 40, driving pulses in a number corresponding to a driving target included in a driving command signal from the outside. The control circuit 30 includes a driving-pulse output unit 61 configured to output the driving pulse in the number corresponding to the driving target, a position-information acquiring unit 52 configured to acquire position information from a potentiometer 75 that reads a rotating position of the output gear 74 of the rotary apparatus 1, and a rotation-abnormality determining unit 59 configured to determine, based on the position information acquired by the position-information acquiring unit 52, whether a rotation abnormality has occurred in the rotary apparatus 1.

13 Claims, 13 Drawing Sheets

CONTROL DEVICE FOR ROTARY APPARATUS, ROTARY APPARATUS, AND CONTROL METHOD FOR ROTARY APPARATUS

CROSS REFERENCE TO RELATED APPLICATIONS

This application claims the benefit of Japanese Patent Applications No. 2019-230454, filed Dec. 20, 2019 and No. 2020-120108, filed Jul. 13, 2020, each of which is hereby incorporated by reference in its entirety.

BACKGROUND

Technical Field

The present disclosure relates to a control device for a rotary apparatus, the rotary apparatus, and a control method for the rotary apparatus.

Background

As a rotary apparatus used as an actuator, for example, a rotary apparatus described in Japanese Patent Application Laid-Open No. 2018-038250 (Patent Literature 1) has been known. The rotary apparatus includes an output gear, a motor that drives the output gear, and a housing in which an opening section communicating with the outside is formed in a position corresponding to the output gear. The output gear can be accessed from the outside of the housing through the opening section.

In such a rotary apparatus, the output gear is controlled to be driven using a stepping motor. That is, the output gear is controlled to be driven to a target position by rotating the stepping motor until a pulse number of a driving signal of the stepping motor reaches a pulse number of a movement target. Since the rotary apparatus using the stepping motor has high position control accuracy, the rotary apparatus is capable of performing fine control.

However, since the rotary apparatus using the stepping motor does not have physical position information of the output gear, when an abnormality (for example, idling) occurs in rotation of the output gear because of breakage or the like of a gear, means for detecting the abnormality is absent.

As a driving control scheme for the rotary apparatus, besides a scheme for performing open loop control using the stepping motor as explained above, there has been known a scheme for performing feedback control by a voltage detected by a potentiometer attached to a rotating mechanism.

The rotary apparatus using the feedback by the potentiometer detects, with the potentiometer, a voltage changing according to rotation of the output gear, specifies a current position of the output gear from the detected voltage, and feeds back a driving amount from the specified current position to thereby control to drive the output gear to a target position. The rotary apparatus using the feedback by the potentiometer is considered to be able to grasp a physical current position of the output gear.

However, in the rotary apparatus using the feedback by the potentiometer, accuracy of position control greatly depends on the performance of the potentiometer. In the rotary apparatus using the feedback by the potentiometer, in order to improve the position control accuracy as in the stepping motor, for example, it is necessary to improve detection sensitivity of the potentiometer. It is likely that structure is complicated, for example, an IC having a high sensitivity characteristic is necessary.

SUMMARY

The present disclosure is related to providing a control device for a rotary apparatus, the rotary apparatus, and a control method for the rotary apparatus that, irrespective of a simple configuration, have high position control accuracy for rotation and are capable of easily detecting that a rotation abnormality is present in the rotary apparatus.

According to an aspect of the present disclosure, a control device for a rotary apparatus includes: a driving circuit configured to apply a driving voltage to a stepping motor that rotates an output gear of the rotary apparatus; and a control circuit configured to output, to the driving circuit, driving pulses in a number corresponding to a driving target included in a driving command signal from an outside. The control circuit includes: a driving-pulse output unit configured to output the driving pulses in the number corresponding to the driving target included in the driving command signal; a position-information acquiring unit configured to acquire position information from a position sensor that reads a rotating position of the output gear of the rotary apparatus; and a rotation-abnormality determining unit configured to determine, based on the position information acquired by the position-information acquiring unit, whether a rotation abnormality has occurred in the rotary apparatus.

In the control device for the rotary apparatus, the position-information acquiring unit may acquire, every time the number of the driving pulses output by the driving-pulse output unit reaches a predetermined value, the position information from the position sensor that reads the rotating position of the output gear of the rotary apparatus.

In the control device for the rotary apparatus, when a difference D between first position information acquired last time by the position-information acquiring unit and second position information acquired this time by the position-information acquiring unit is different from an ideal difference C by a tolerance value α or more, the rotation-abnormality determining unit may determine that the rotation abnormality has occurred in the rotary apparatus.

In the control device for the rotary apparatus, the position-information acquiring unit may acquire, at timing of each of an output start and an output end of the driving pulse in the driving-pulse output unit, the position information from the position sensor that reads the rotating position of the output gear of the rotary apparatus, and, when the difference D between third position information acquired by the position-information acquiring unit at the timing of the output start of the driving pulse and fourth position information acquired by the position-information acquiring unit at the timing of the output end of the driving pulse is different from the ideal difference C by the tolerance value α or more, the rotation-abnormality determining unit may determine that the rotation abnormality has occurred in the rotary apparatus.

In the control device for the rotary apparatus, the control circuit may further include an output stop unit configured to stop the output of the driving pulse in the driving-pulse output unit when the rotation-abnormality determining unit determines that the rotation abnormality has occurred in the rotary apparatus.

In the control device for the rotary apparatus, the position sensor may be a potentiometer that outputs, as the position information, a voltage corresponding to the rotating position.

In the control device for the rotary apparatus, the control circuit may include: a first counter configured to count the number of the driving pulses output by the driving-pulse output unit; a first memory configured to store the predetermined value; a comparator configured to compare a value counted by the first counter and the predetermined value stored in the first memory; and an command unit configured to, as a result of the comparison by the comparator, when the counted value is larger than the predetermined value, determine that the number of the driving pulses reaches the predetermined value and give commands to the units of the control circuit.

The control device for the rotary apparatus may include a rotation-abnormality-determination limiting unit configured to, when the rotating position of the output gear driven by the driving pulse is a position in a dead zone where the position sensor cannot read the rotating position, limit the determination in the rotation-abnormality determining unit not to be executed.

In the control device for the rotary apparatus, the control circuit may further include an initial-position-abnormality determining unit configured to, when the position information acquired from the position-information acquiring unit during a power supply start indicates that the rotating position of the output gear is a position in the dead zone of the position sensor, determine that an initial position abnormality has occurred, and the control circuit may notify the initial position abnormality determined by the initial-position-abnormality determining unit to the outside.

In the control device for the rotary apparatus, when the control circuit receives a first driving command signal after the power supply start, after the initial-position-abnormality determining unit determines that the initial position abnormality has occurred, the driving-pulse output unit may output, instead of the driving pulses in the number corresponding to the driving target included in the driving command signal, driving pulses until the position-information acquiring unit can acquire position information based on a rotating position read by the position sensor in the position-information acquiring unit.

The control device for the rotary apparatus may include: a position memory storing a current position formed by a combination of the rotating position of the output gear of the rotary apparatus and a number of revolutions of the output gear of the rotary apparatus; a pulse counter configured to count the number of the driving pulses output by the driving-pulse output unit and output a pulse count value; and a round counter configured to output a round count value obtained by counting, from a current position of the position memory, according to the driving pulses equivalent to the pulse count value, a number of times of passage in a forward direction in a reference position in one rotation of the position sensor, and the current position of the position memory may be updated using the pulse count value and the round count value.

In the control device for the rotary apparatus, in case of passage in an opposite direction in the reference position in the one rotation of the position sensor, the round counter may count down the round count value.

According to an aspect of the present disclosure, a rotary apparatus includes: a stepping motor driven to be rotated by the control device for the rotary apparatus; an output gear configured to interlock with a rotary motion of the stepping motor and rotate; and a position sensor configured to detect a rotating position of the output gear.

According to an aspect of the present disclosure, a control method for a rotary apparatus includes: a driving-pulse output step of repeatedly outputting, to a driving circuit that applies a driving voltage to a stepping motor that rotates an output gear of the rotary apparatus, driving pulses by a number of times corresponding to a driving target; a position-information acquiring step of acquiring, at predetermined repetition timing of the driving-pulse output step, position information from a position sensor that reads a rotating position of the output gear of the rotary apparatus; and a rotation-abnormality determining step of determining, based on the position information acquired in the position-information acquiring step, whether a rotation abnormality has occurred in the rotary apparatus.

The control method for the rotary apparatus may further include a dead-zone determining step of, after the position-information acquiring step, determining whether the rotating position of the output gear driven by the driving pulse is a position in a dead zone of the position sensor where the position sensor cannot read the rotating position, and the rotation-abnormality determining step may be executed only when it is determined in the dead-zone determining step that the rotating position of the output gear is not the position in the dead zone of the position sensor.

With the control device for the rotary apparatus, the rotary apparatus, and the control method for the rotary apparatus of the present disclosure, irrespective of a simple configuration, position control accuracy for rotation is high and it is possible to easily detect that a rotation abnormality is present in the rotary apparatus.

DETAILED DESCRIPTION

Figure 1:
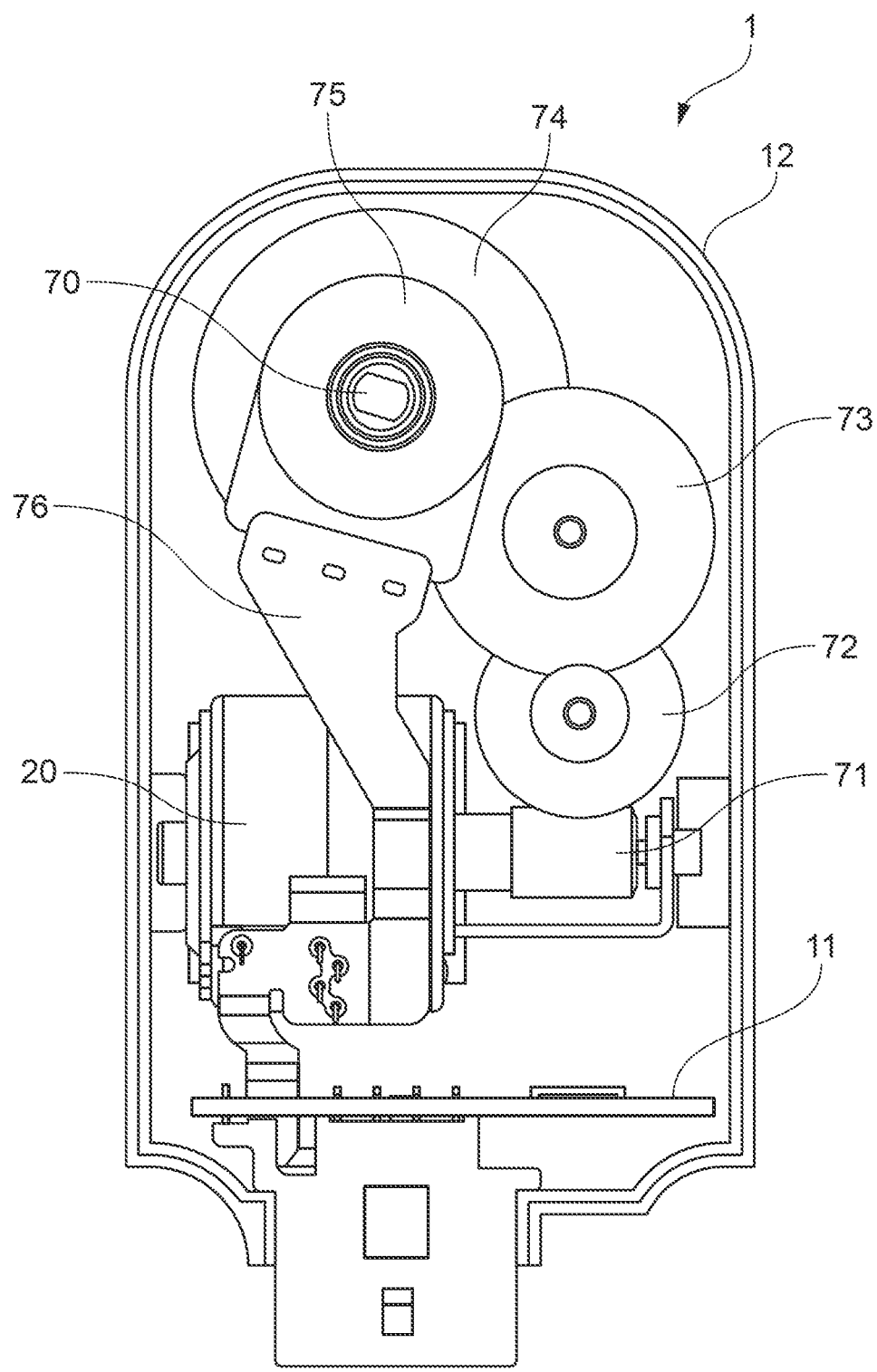
FIG. 1 is a schematic configuration diagram showing an example of a rotary apparatus in a first embodiment.

Specific examples of embodiments of the present disclosure are explained below with reference to the drawings. In the following explanation, components common to the embodiments are denoted by the same reference numerals and signs and repeated explanation of the components is omitted.

First Embodiment

First, a control device for a rotary apparatus, the rotary apparatus, and a control method for the rotary apparatus in a first embodiment are explained.

FIG. 1 is a schematic configuration diagram showing an example of the rotary apparatus in the first embodiment. A rotary apparatus 1 includes, as shown in FIG. 1, in a housing 12, a control board 11, a stepping motor 20, an actuator output shaft 70, a first gear 71, a second gear 72, a third gear 73, an output gear 74, a potentiometer (an example of a position sensor) 75, and an FPC (flexible printed circuits) 76.

The control board 11 is mounted with a control device 10 for the rotary apparatus 1. The mounted control device 10 is wired to be electrically connected to the stepping motor 20 and the potentiometer 75 via the FPC 76. The control device 10 applies a driving voltage to the stepping motor 20 to thereby control to drive an output shaft of the stepping motor 20. The control device 10 for the rotary apparatus 1 in this embodiment can receive, as position information, a voltage corresponding to a rotating position read by the potentiometer 75 but does not use the received position information for rotation driving (does not perform rotation driving according to feedback based on the position information).

The first gear 71 is provided in the output shaft of the stepping motor 20. When the first gear 71 is driven to rotate by the stepping motor 20, the second gear 72 and the third gear 73 rotate interlocking with the rotation. When these gears 71, 72, and 73 rotate, the output gear 74 finally rotates interlocking with the rotation.

The output gear 74 includes the actuator output shaft 70. The actuator output shaft 70 is connected to a driving target object on the outside. The potentiometer 75 is provided in the output gear 74. The potentiometer 75 can read a rotating position of the output gear 74 by measuring a voltage value that changes according to a rotating position.

Figure 2:
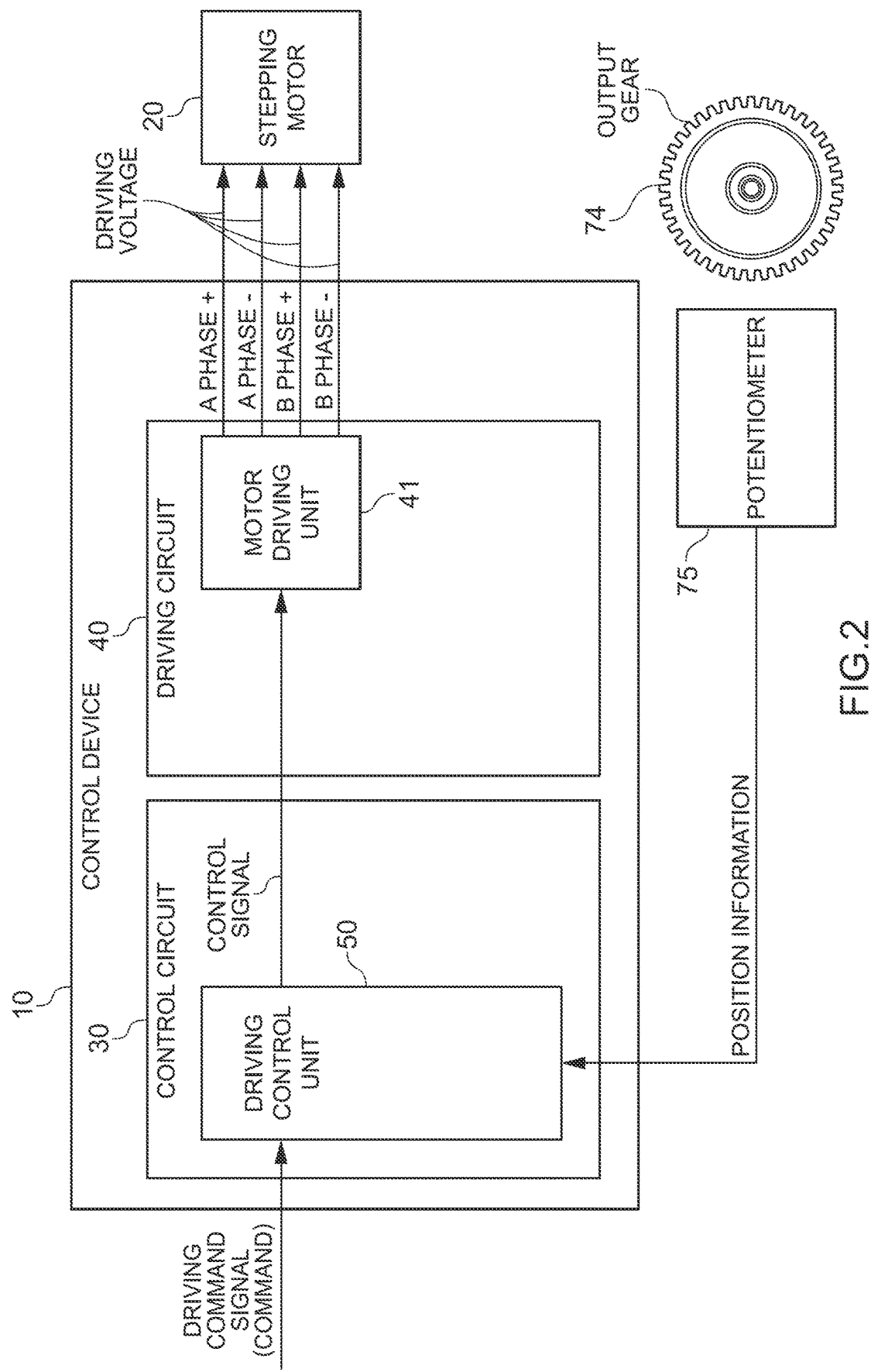
FIG. 2 is a schematic configuration diagram showing an example of a control device for the rotary apparatus in the first embodiment.
Figure 3:
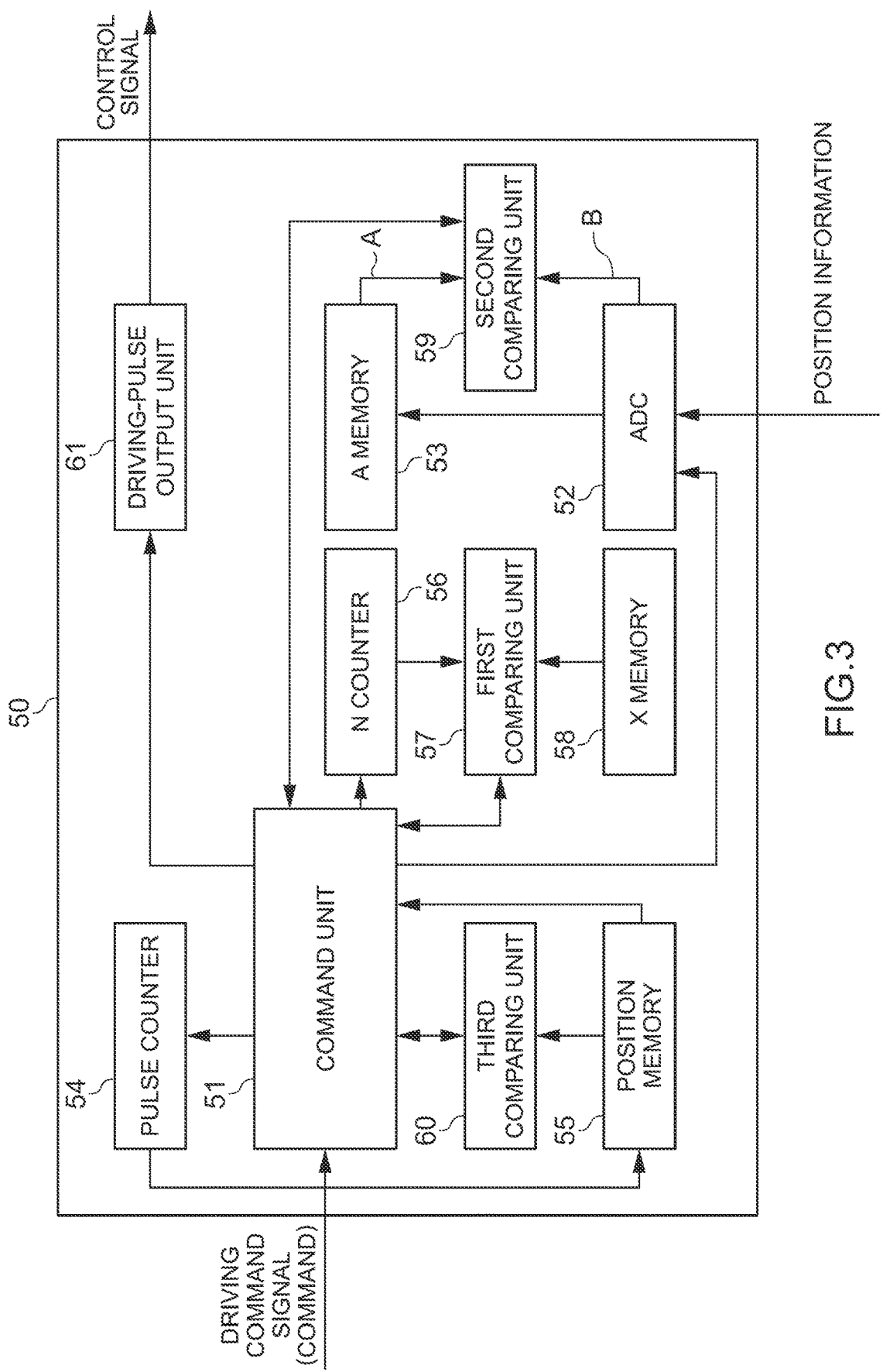
FIG. 3 is a diagram showing a configuration example of functional blocks realized by a driving control unit of a control circuit.

FIG. 2 is a schematic configuration diagram showing an example of the control device for the rotary apparatus in the first embodiment. FIG. 3 is a diagram showing a configuration example of functional blocks realized by a driving control unit 50 of a control circuit 30. The control device 10 for the rotary apparatus 1 includes the control circuit 30 and a driving circuit 40 as shown in FIG. 2.

A driving command signal (a command) is input to the control circuit 30 from the outside via a LIN (Local Interconnect Network). The driving command signal is a signal including a driving target for driving the stepping motor 20 such that a driving target object connected to the actuator output shaft 70 performs a desired operation. The driving target may be the number of rotation steps of the stepping motor 20, may be a rotation amount of the actuator output shaft 70, or may be a rotating position of the actuator output shaft 70 and is not particularly limited.

The control circuit 30 includes the driving control unit 50 that outputs driving pulses in the number corresponding to the driving target included in the driving command signal to the driving circuit 40 as a control signal. The driving circuit 40 includes a motor driving unit 41 that applies a driving voltage for driving the stepping motor 20.

An output from the potentiometer 75, which reads a rotating position of the output gear 74, is input to the driving control unit 50.

The driving control unit 50 includes hardware elements including a processor such as a CPU, various memories such as a ROM and a RAM, a timer (a counter), an A/D conversion circuit, an input and output I/F circuit, and a clock generation circuit. The driving control unit 50 is configured by a program processing device (for example, a microcontroller: MCU) in which the components are connected to one another via a bus or a leased line.

The processor performs various arithmetic operations according to a program stored in a storage device (not illustrated) such as a memory and controls peripheral circuits such as the A/D conversion circuit and the input and output I/F circuit, whereby the driving control unit 50 realizes the configuration of the functional units shown in FIG. 3. That is, as shown in FIG. 3, the driving control unit 50 includes, as the functional units, an command unit (an example of a rotation-abnormality detecting unit) 51, an AD converter (ADC: an example of a position-information acquiring unit) 52, an "A" memory 53, a pulse counter 54, a position memory 55, an "N" counter 56, a first comparing unit 57, an "X" memory 58, a second comparing unit 59, a third comparing unit 60, and a driving-pulse output unit 61. The functional units in the driving control unit 50 can execute various kinds of processing based on commands of the command unit 51. Each of the first comparing unit 57, the second comparing unit 59 and the third comparing unit 60 can be configured as a comparator or as a software functional unit.

When receiving a driving command signal from the outside, the command unit 51 outputs driving pulses in a number corresponding to a driving target included in the driving command signal to the driving-pulse output unit 61 and outputs count commands to the pulse counter 54 and the "N" counter 56. The command unit 51 can calculate, as a target count value, the number of driving pulses for reaching the driving target included in the driving command signal.

The command unit 51 can acquire position information "A" (reference position information and first position information) at predetermined timing such as an output start of a driving pulse and give an command for storing the acquired position information "A" in the "A" memory 53 to the AD converter 52. The command unit 51 can give comparison commands to the first comparing unit 57, the second comparing unit 59, and the third comparing unit 60 at predetermined timings. The command unit 51 performs various kinds of determination control based on comparison results received from the comparing units 57, 59, and 60.

The AD converter 52 receives the command from the command unit 51, acquires a voltage (position information) corresponding to the rotating position input from the potentiometer 75, AD-converts the voltage, and stores the voltage in the "A" memory 53 as first position information. Thereafter, the AD converter 52 receives the command from the command unit 51 at timing of rotation abnormality determination, AD-converts the voltage corresponding to the rotating position input from the potentiometer 75, and passes the voltage to the second comparing unit 59 as second position information. The second position information acquired at the timing of the rotation abnormality determination is passed to the second comparing unit 59 and overwritten on the information stored in the "A" memory 53 as the first position information, whereby a reference position can be updated at the timing of the rotation abnormality determination.

The driving-pulse output unit 61 receives the command from the command unit 51 and outputs a driving pulse to the motor driving unit 41 of the driving circuit 40.

The pulse counter 54 receives the command from the command unit 51, increments a counter, and passes an incremented count value to the position memory 55. The position memory 55 stores (updates), anew, as information concerning a rotating position (a position count value), the stored position (position count value) added with the acquired count value and notifies the command unit 51 that the information is stored.

The "N" counter 56 receives the command from the command unit 51, increments a counter, and holds an incremented count value (an N count value). The first comparing unit 57 receives the command from the command unit 51, compares a predetermined value (referred to as X value as well) held in the "X" memory 58 and the N count value held in the "N" counter 56, and returns a result of the comparison to the command unit 51.

The X value held in the "X" memory 58 serves as a reference of timing for determining a rotation abnormality of the rotary apparatus 1. The X value can be set based on the performance of the potentiometer 75. "A" value of the X value is not particularly limited. By increasing the X value when the performance of the potentiometer 75 is low and reducing the X value when the performance of the potentiometer 75 is high, it is possible to accurately determine a rotation abnormality at appropriate resolution corresponding to the performance of the potentiometer 75.

The second comparing unit 59 receives the command from the command unit 51, compares the position information "A" (the first position information) stored in the "A" memory 53 and position information B (the second position information) acquired via the AD converter 52, and returns a result of the comparison to the command unit 51.

The third comparing unit 60 receives the command from the command unit 51, compares the position count value held in the position memory 55 and the target count value set as a driving target, and returns a result of the comparison to the command unit 51.

Figure 4:
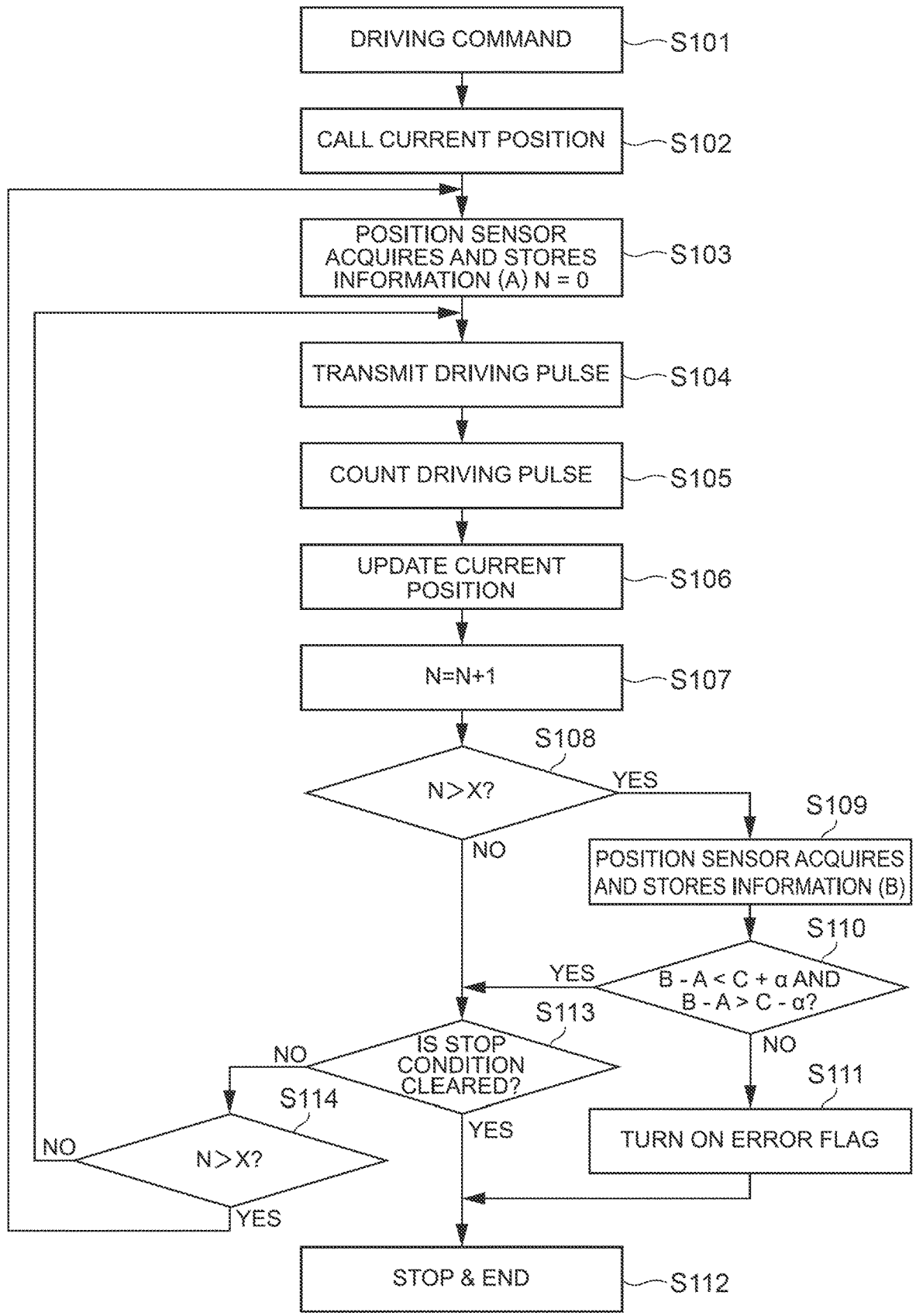
FIG. 4 is a flowchart for explaining the operation of the control device for the rotary apparatus in the first embodiment.

The operation of the control device for the rotary apparatus in the first embodiment explained above is explained. FIG. 4 is a flowchart for explaining the operation of the control device for the rotary apparatus in the first embodiment. In the control device 10 for the rotary apparatus 1 in this embodiment, the command unit 51 receives a driving command signal (a command) from the outside (S101) to thereby start the operation shown in FIG. 4.

When receiving a driving command, first, the command unit 51 performs various setting operations for appropriately performing rotation abnormality determination prior to transmission processing for a driving pulse. Specifically, the command unit 51 acquires a current position (calls a current position) from the position memory 55 (S102). Thereafter, the command unit 51 instructs the AD converter 52 to acquire current position information read by the potentiometer 75. The AD converter 52 acquires, as a reference position, position information (an example of first position information) "A" read by the potentiometer 75 and stores the acquired position information "A" in the "A" memory 53 (S103). At timing of step S103, the "N" counter 56 receives a reset command from the command unit 51 and resets a value of the "N" counter to 0.

Subsequently to step S103, the driving-pulse output unit 61 receives a transmission command for an output pulse to the driving-pulse output unit 61 from the command unit 51 and transmits a driving pulse to the motor driving unit 41 of the driving circuit 40 (S104). Consequently, the stepping motor 20 is applied with a driving voltage and controlled to be driven by the motor driving unit 41.

Subsequently to step S104, the pulse counter 54 receives a count command for an output pulse from the command unit 51, increments a counter (S105), and passes an incremented count value to the position memory 55. When receiving the incremented count value, the position memory 55 updates a current position (position count value) from the position called in step S102 and the received count value (S106). Consequently, the position count value is updated until the position count value reaches the driving target (the target count value).

Subsequently to step S106, the "N" counter 56 receives a count command for the "N" counter from the command unit 51 and increments an "N" counter value (S107). Consequently, the "N" counter value reflects the number of times of transmission of driving pulses at every predetermined rotation abnormality determination interval.

Subsequently to step S107, the first comparing unit 57 receives a comparison command from the command unit 51, compares the "N" counter value of the "N" counter 56 and the X value held in the "X" memory 58 (determines whether the "N" counter value>the X value) (S108), and passes a result of the comparison to the command unit 51. Consequently, since the first comparing unit 57 compares the X value serving as a reference for timing for determining a rotation abnormality of the rotary apparatus 1 and the "N" counter value reflecting the number of times of transmission of driving pulses, it is possible to determine timing for rotation abnormality determination that should be executed at the predetermined rotation abnormality determination interval.

When receiving a comparison result that the "N" counter value is larger than the X value (Yes in S108), the command unit 51 determines that this timing is the predetermined rotation abnormality determination interval and executes rotation abnormality determination processing. Specifically, the command unit 51 requests the AD converter 52 to acquire current position information and gives a comparison command to the second comparing unit 59. When receiving the comparison command from the command unit 51, the second comparing unit 59 acquires the position information "A" stored in the "A" memory 53 and the current position information (an example of second position information) B acquired by the AD converter 52 (S109). Subsequently to step S109, the second comparing unit 59 calculates a difference D between the position information "A" and the position information B (=B−A or =A−B), compares values ((C−α) and (C+α)) obtained by adjusting, with the tolerance value α, the ideal difference C held in advance and the calculated difference D (S110), and passes a result of the comparison to the command unit 51. Any value can be set as the tolerance value α. The absolute value of −α and +α may be set to different values.

When obtaining a comparison result that the calculated difference D is outside a range of values obtained by adjusting the ideal difference C with the tolerance value α ((C−α)<D<(C+α) is not satisfied) (No in S110), the command unit 51 determines that a rotation abnormality has occurred in the rotary apparatus 1, turns on an error flag (S111), and causes the driving-pulse output unit 61 to stop the output of the driving pulse. Consequently, the driving of the stepping motor 20 is stopped (S112). The processing for turning on the error flag in step S111 can be omitted as well.

Figure 5:
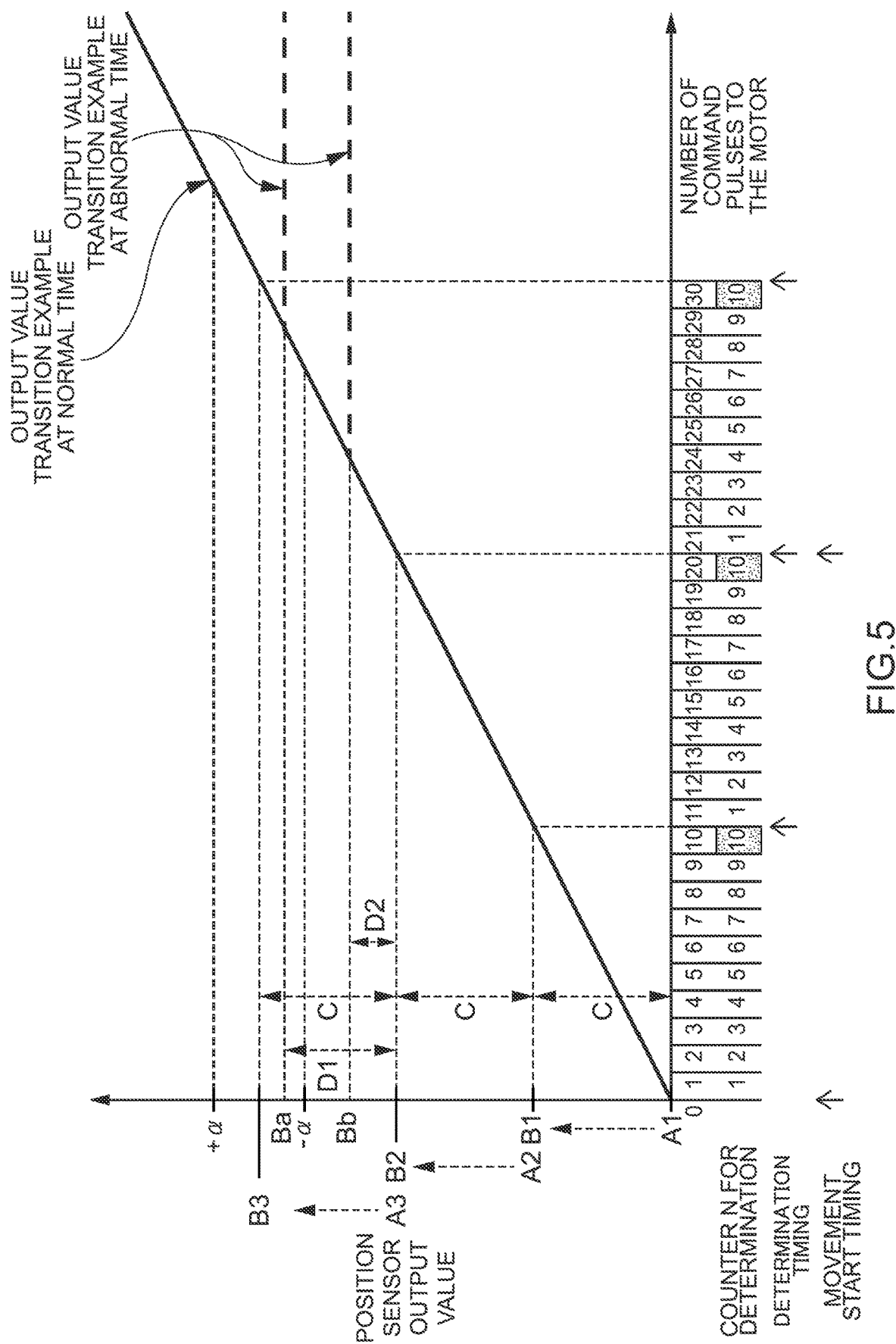
FIG. 5 is a diagram for explaining rotation abnormality determination.

The rotation abnormality determination processing is further explained with reference to FIG. 5. FIG. 5 is a diagram for explaining the rotation abnormality determination. In an example shown in FIG. 5, the number of command pulses per one driving of the stepping motor output according to the driving command signal is 20 pulses, a predetermined rotation abnormality determination interval for pulses is 10 pulses (that is, the X value is 9), and the tolerance value is a. This example only shows an example of numerical values and is not limited to these values.

In FIG. 5, the number of command pulses to the motor is shown on the horizontal axis and a position sensor output value is shown on the vertical axis. A counter N for determination (an N counter value), rotation abnormality determination timing, and movement start timing are shown along the horizontal axis. In this example, it is seen that the N counter value is updated at every 10 counts and determination timing comes at every 10 pulses (counts). This figure indicates that position information A1, A2, and A3 serving as reference positions are stored in the "A" memory 53 as first position information. Position information B1, B2, and B3 indicate ideal second position information respectively corresponding to the position information A1, A2, and A3.

In the control device 10 for the rotary apparatus 1 in this embodiment, at normal time, as indicated by a graph of an output value transition example at the normal time shown in FIG. 5, an output value (a value of position information) of a position sensor increases in proportion to an increase in the number of driving pulses. However, when a rotation abnormality has occurred, the output value shows a value deviating from this graph.

In the following explanation, at determination timing of a thirtieth step, as an example, "Ba" is acquired as current position information B and, as another example, "Bb" is acquired as the current position information B.

In this case, at determination timing immediately preceding the determination timing of the thirtieth step, the position information A3 serving as the reference position is stored in the "A" memory 53 as the first position information. Therefore, when "Ba" is acquired as the current position information (an example of the second position information) B, a difference D1 is Ba–A3. The difference D1 is within a range of values obtained by adjusting the ideal difference C with the tolerance value α. Therefore, in this case, it is not determined that a rotation abnormality has occurred.

On the other hand, when "Bb" is acquired as the current position information (an example of the second position information) B, the difference D2 is Bb–A3. The difference D2 is outside the range of values obtained by adjusting the ideal difference C with the tolerance value α. Therefore, in this case, the current position information B is considered to not reach "B3", which is a position corresponding to the number of output pulses. It is determined that a rotation abnormality has occurred.

On the other hand, when receiving the comparison result that the N counter value is not larger than the X value in step S108 in FIG. 4 (No in S108), the command unit 51 can determine that it is not timing for rotation abnormality determination. Similarly, when receiving a comparison result that the calculated difference D is within the range of values obtained by adjusting the ideal difference C with the tolerance value α(($C-α)<D<(C+α$)) (Yes in S110), the command unit 51 can determine that, as a result of the rotation abnormality determination, an abnormality is absent. In these cases (No in S108 and Yes in S110), the command unit 51 gives a comparison command to the third comparing unit 60 in order to determine a stop condition. When receiving the comparison command, the third comparing unit 60 compares a target count value and a position count value in order to determine whether the stop condition is cleared (S113) and passes a result of the comparison to the command unit 51.

When receiving a comparison result that the stop condition is cleared because the position count value reaches the target count value (Yes in S113), the command unit 51 ends transmission of the driving pulse (S112).

When receiving a comparison result that the stop condition is not cleared because the position count value does not reach the target count value (No in S113), the command unit 51 determines, according to whether the comparison result received in step S108 indicates "the N counter value>the X value", whether it is the timing for the rotation abnormality determination (S114). When determining as a result of the determination in step S114 that it is the timing for the rotation abnormality determination (Yes in S114), the command unit 51 returns to the processing in step S103. When determining as a result of the determination in step S114 that it is not the timing for the rotation abnormality determination (No in S114), the command unit 51 returns to the processing in step S104.

With the control device for the rotary apparatus, the rotary apparatus, and the control method for the rotary apparatus in this embodiment, the control of the rotating position of the stepping motor is performed by open control based on a driving command signal as in the past. That is, since the position information from the position sensor is not used as position information in normal motor driving, the high position accuracy and the high resolution in the stepping motor in the past are not spoiled. On the other hand, the position information may be information in a degree enough for discriminating whether the output gear physically moves. High accuracy position detection of a position sensor used for the normal position detection is unnecessary. An inexpensive position sensor with rough accuracy can be used. Therefore, the position sensor can be realized at low cost.

Second Embodiment

A control device for a rotary apparatus, the rotary apparatus, and a control method for the rotary apparatus in a second embodiment are explained. In the first embodiment, the command unit 51 performs the rotation abnormality determination at the predetermined rotation abnormality determination interval. However, this embodiment is different from the first embodiment in that, after performing driving to "stop condition cleared" set as a driving target, the command unit 51 performs rotation abnormality determination. In the second embodiment, concerning the components other than the command unit 51, a control device for a rotary apparatus and the rotary apparatus having configurations similar to the configurations in the first embodiment can be adopted. Concerning the second embodiment, only components different from the components in the first embodiment are explained. Explanation about components common to the first embodiment is omitted.

Figure 6:
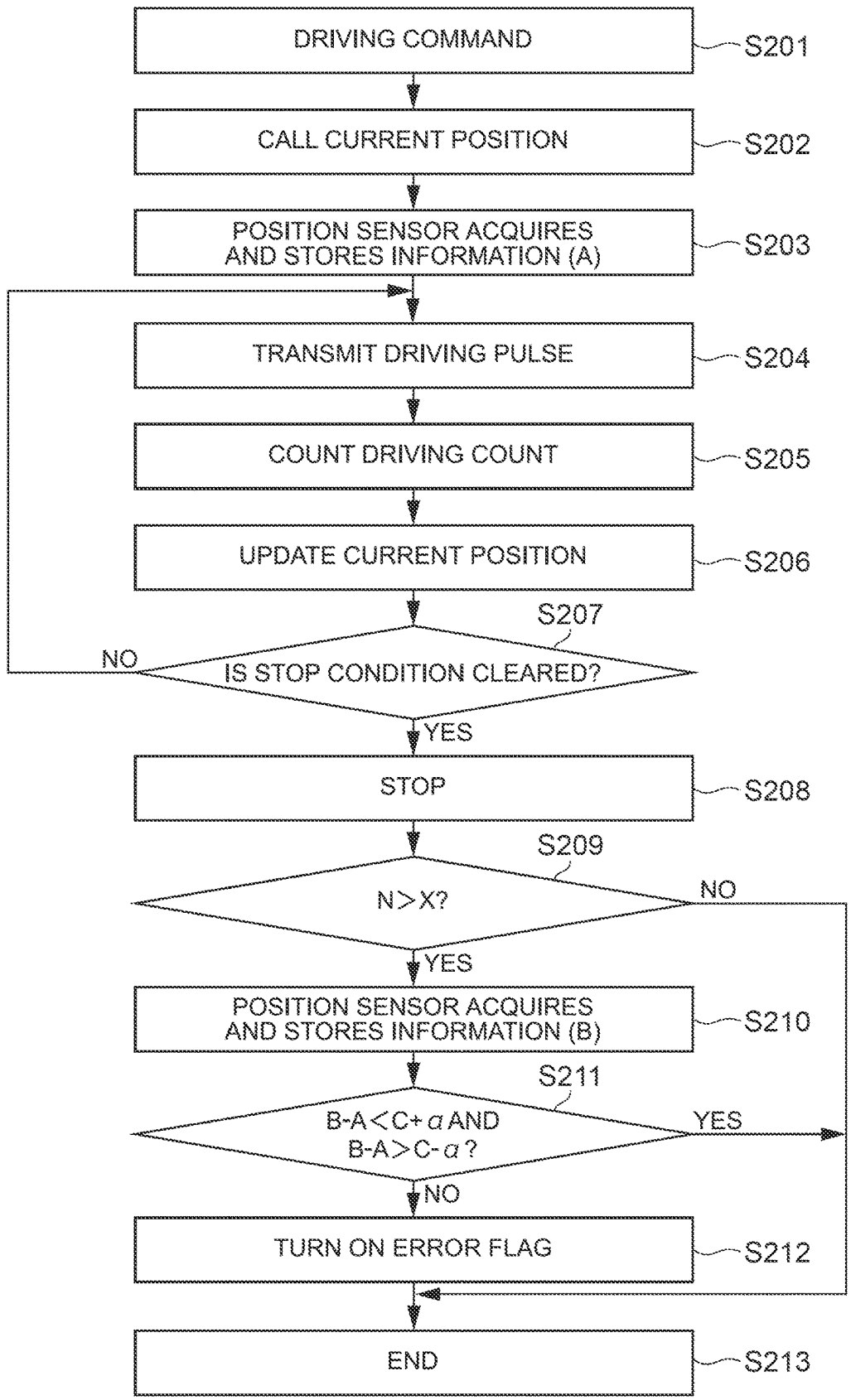
FIG. 6 is a flowchart for explaining the operation of a control device for a rotary apparatus in a second embodiment.

FIG. 6 is a flowchart for explaining the operation of the control device for the rotary apparatus in the second embodiment. The operation of the control device 10 for the rotary apparatus 1 in the second embodiment is explained with reference to FIGS. 3 to 6. In the control device 10 for the rotary apparatus 1 in the second embodiment, processing similar to the processing in step S101 to step S106 in the first embodiment is performed in step S201 to step S206 in FIG. 6. Processing similar to the processing in step S109 to step S112 in the first embodiment is performed in step S210 to step S213 in FIG. 6.

In this embodiment, transmission of a driving pulse (S204) to update of a current position (S206) are repeated until a stop condition is cleared (Yes in S207).

When determining that the stop condition is cleared (Yes in S207), the command unit 51 stops driving of the stepping motor 20 (S208) and determines whether a determination condition is satisfied (S209). Specifically, the first comparing unit 57 receives a comparison command with the command unit 51, compares an N counter value of the "N" counter 56 and a X value of the "X" memory 58, and returns a result of the comparison to the command unit 51. When the N counter value is larger than the X value, the command unit 51 determines that the determination condition is satisfied.

In this embodiment, in step S203, position information at timing of an output start of a driving pulse is acquired. The acquired position information (an example of third position information) "A" is stored in the "A" memory 53 as information concerning a reference position. Concerning the rotation abnormality determination processing, in step S210, position information (an example of fourth position information) B at timing of an output end of the driving pulse is acquired. In step S211, the rotation abnormality determination is performed by calculating the difference D between the position information B and the position information "A" stored in the "A" memory 53 and comparing the difference D.

In this embodiment, when the number of driving pulses is too small, accuracy of the rotation abnormality determination is deteriorated. Therefore, it is possible to avoid the deterioration in the accuracy of the rotation abnormality determination with processing for determining whether to execute the rotation abnormality determination in step S209. However, when the control device 10 for the rotary apparatus 1 is used for a use in which the number of driving pulses per one driving of the stepping motor 20 output according to the driving command signal is sufficiently large, the processing in step S209 is not always necessary. In this case, the "N" counter 56, the first comparing unit 57, and the "X" memory 58 of the control device shown in FIG. 3 can be omitted.

As explained above, according to the first embodiment and the second embodiment, it is possible to provide the control device for the rotary apparatus, the rotary apparatus, and the control method for the rotary apparatus that, irrespective of a simple configuration, have high position control accuracy for rotation, can easily detect that a rotation abnormality is present in the rotary apparatus, and is capable of enlarging a rotatable region.

On the other hand, in a rotary apparatus using rotation position detection by a position sensor such as a potentiometer, a dead zone where position information cannot be acquired is present within a range of one rotation of the position sensor. An output value is reset when rotation exceeds one rotation (360 degrees). Therefore, position management for one rotation or more is difficult. Therefore, if these regions where the rotation position detection is difficult can be controlled as movable regions, it is considered that the rotatable region can be enlarged.

Therefore, in a third embodiment and a fourth embodiment, it is made possible to control these regions where the position detection is possible and the rotation position detection is difficult as movable regions and the rotatable region is enlarged.

Third Embodiment

Figure 7:
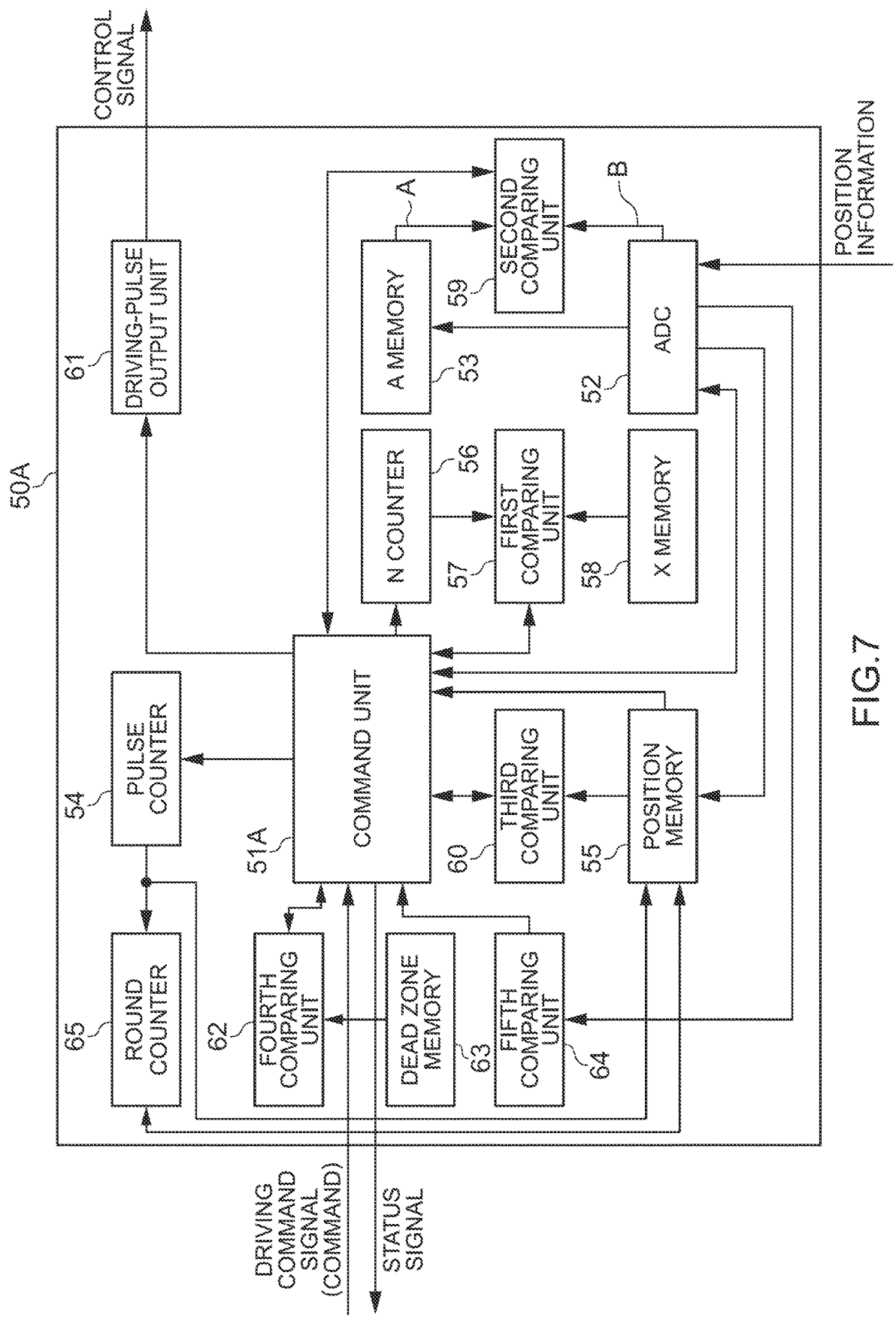
FIG. 7 is a diagram showing a configuration example of functional blocks realized by a driving control unit of a control circuit in a third embodiment.

A control device for a rotary apparatus, the rotary apparatus, and a control method for the rotary apparatus in a third embodiment are explained. FIG. 7 is a diagram showing a configuration example of functional blocks realized by a driving control unit 50A of the control circuit 30 in the third embodiment. In this embodiment, the rotary apparatus includes the same configuration as the configuration of the rotary apparatus in the first embodiment except that the driving control unit 50A is used instead of the driving control unit 50 (see FIG. 2) of the rotary apparatus in the first embodiment. Repeated explanation of the configuration is omitted.

A processor performs various arithmetic operations according to a program stored in a storage device (not illustrated) such as a memory and controls peripheral circuits such as the A/D conversion circuit and the input and output I/F circuit, whereby the driving control unit 50A in the third embodiment realizes the configuration of the functional units shown in FIG. 7. That is, as shown in FIG. 7, the driving control unit 50A includes, as the functional units, an command unit (an example of a rotation-abnormality detecting unit, a rotation-abnormality-determination limiting unit, and an initial-position-abnormality determining unit) 51A, the AD converter (ADC: an example of a position-information acquiring unit) 52, the "A" memory 53, the pulse counter 54, the position memory 55, the "N" counter 56, the first comparing unit 57, the "X" memory 58, the second comparing unit 59, the third comparing unit 60, the driving-pulse output unit 61, a fourth comparing unit 62, a dead zone memory 63, a fifth comparing unit 64, and a round counter 65. The functional units in the driving control unit 50A can execute various kinds of processing based on commands of an command unit 51A. Each of the first comparing unit 57, the second comparing unit 59, the third comparing unit 60, the fourth comparing unit 62, the fifth comparing unit 64 can be configured as a comparator or as a software functional unit.

When receiving a driving command signal from a host controller (not illustrated; an example of the outside), the command unit 51A outputs driving pulses in a number corresponding to a driving target included in the driving command signal to the driving-pulse output unit 61 and outputs count commands to the pulse counter 54 and the "N" counter 56. The command unit 51A can calculate, as a target count value, the number of driving pulses for reaching the driving target included in the driving command signal.

The command unit 51A can acquire position information "A" (reference position information and first position information) at predetermined timing such as an output start of a driving pulse and give an command for storing the acquired position information "A" in the "A" memory 53 to the AD converter 52. The command unit 51A can give comparison commands to the first comparing unit 57, the second comparing unit 59, the third comparing unit 60, the fourth comparing unit 62, and the fifth comparing unit 64 at predetermined timings. The command unit 51A performs various kinds of determination control based on comparison results received from the comparing units 57, 59, 60, 62, and 64.

The AD converter 52 receives the command from the command unit 51A, acquires a voltage (position information) corresponding to the rotating position input from the potentiometer 75, and stores an AD-converted value (hereinafter referred to as ADC value as well) in the "A" memory 53 as first position information. Thereafter, the AD converter 52 receives the command from the command unit 51A at timing of rotation abnormality determination and passes a value (an ADC value) obtained by AC-converting a voltage corresponding to the rotating position input from the potentiometer 75 to the second comparing unit 59 as second position information. The second position information acquired at the timing of the rotation abnormality determination is passed to the second comparing unit 59 and overwritten on the information stored in the "A" memory 53 as the first position information, whereby a reference position can be updated at the timing of the rotation abnormality determination.

The driving-pulse output unit 61 receives the command from the command unit 51A and outputs a driving pulse to the motor driving unit 41 of the driving circuit 40.

The pulse counter 54 receives the command from the command unit 51A, increments a counter, and passes an incremented pulse count value to the position memory 55 and the round counter 65. When receiving the pulse count value from the pulse counter 54, the round counter 65 refers to a current rotating position (a position count value: a value corresponding to 0 degrees to 360 degrees) of the output gear 74 stored in the position memory 55 and adds the pulse count value received from the pulse counter 54 to the position count value to thereby count up a round count value by the number of times of passage in a forward direction through a boundary (a reference position) in one rotation of the potentiometer 75 and passes the round count value to the position memory 55. The position memory 55 stores (updates), anew, as information concerning a rotating position (a position count value and a round count value), values obtained by adding the acquired pulse count value and the acquired round count value to a position (a position count value and a round count value) corresponding to the stored rotating position of the output gear 74 and notifies the storage to the command unit 51A. That is, a current position (a position) of the position memory 55 is updated using the pulse count value and the round count value.

The command unit 51A can transmit, according to necessity, the position stored in the position memory 55 to the host controller as a status signal. The rotary apparatus 1 in this embodiment manages, with the position count value and the round counter value, a current position (a position) stored in the position memory 55. A position within a rotation range of 360 degrees (that is, in one rotation) in the past can be managed by a position count value P. In a region exceeding the rotation range of 360 degrees (that is, a region exceeding one rotation), a position can be managed using a round count value n as well. When a wiper of the potentiometer 75 passes a reference position (for example, 0 degrees) clockwise (an example of a forward direction), the round count value n is counted up. When the wiper of the potentiometer 75 passes the reference position (for example, 0 degrees) counterclockwise (an example of an opposite direction), the round count value n is counted down. For example, three rounds are defined as 100 positions, the position (current rotating position) stored in the position memory 55 can be represented by a sum of a n×(1000/3) positions corresponding to the round count value n and a (P/360)×(1000/3) positions corresponding to the position count value P. The command unit 51A can report a current position represented using the position count value P and the round count value n to the host controller. Consequently, the rotary apparatus 1 in this embodiment can also be used in a mechanism that requires rotation of 360 degrees or more such as a lack mechanism and a link mechanism. The reference position is not limited to 0 degrees and can be set to any angle position.

The "N" counter 56 receives the command from the command unit 51A, increments a counter, and holds an incremented count value (an N count value). The first comparing unit 57 receives the command from the command unit 51A, compares the predetermined value (referred to as X value as well) held in the "X" memory 58 and the N count value held in the "N" counter 56, and returns a result of the comparison to the command unit 51A.

The command unit 51A determines, based on the comparison result received from the first comparing unit 57, whether it is timing for determining a rotation abnormality. If it is the timing for determining a rotation abnormality, the command unit 51A instructs the second comparing unit 59 to execute comparison processing for determination of a rotation abnormality.

The X value held in the "X" memory 58 serves as a reference for the timing for determining a rotation abnormality of the rotary apparatus 1. The X value can be set based on the performance of the potentiometer 75 and a value of the X value is not particularly limited. By increasing the X value when the performance of the potentiometer 75 is low and reducing the X value when the performance of the potentiometer 75 is high, it is possible to accurately determine a rotation abnormality at appropriate resolution corresponding to the performance of the potentiometer 75.

The second comparing unit 59 receives the command from the command unit 51A, compares the position information "A" (the first position information) stored in the "A" memory 53 and the position information B (the second position information) acquired via the AD converter 52, and returns a result of the comparison to the command unit 51A.

The command unit 51A determines, based on the comparison result received from the second comparing unit 59, whether a rotation abnormality has occurred. If a rotation abnormality has not occurred, the command unit 51A instructs the third comparing unit 60 to execute processing for determination of a stop condition.

The third comparing unit 60 receives an command from the command unit 51A, compares the position (the position count value and the round count value) held in the position memory 55 and the target count value set as the driving target, and returns a result of the comparison to the command unit 51A.

The command unit 51A can determine, based on the comparison result received from the third comparing unit 60, that it is necessary to transmit a driving pulse when a difference is present between the position and the target count value and, when the position and the target count value coincide, can determine that the stop condition is cleared.

The fourth comparing unit 62 receives the command from the command unit 51A at the timing of the rotation abnormality determination, compares the position count value indicating the rotating position of the output gear 74 driven by the driving pulse and a rotating position corresponding to the dead zone of the potentiometer 75 stored in the dead zone memory 63, and passes a result of the comparison to the command unit 51A. When giving the command to the fourth comparing unit 62, the command unit 51A can acquire the position count value from the position memory 55 and pass the position count value to the fourth comparing unit 62.

The command unit 51A determines, based on the comparison result received from the fourth comparing unit 62, whether the rotating position of the output gear 74 rotated by the stepping motor 20 is a position in the dead zone of the potentiometer 75. When determining that the rotating position of the output gear 74 is the position in the dead zone of the potentiometer 75, the command unit 51A functions as the rotation-abnormality-determination limiting unit and performs control not to execute the rotation abnormality determination even at the timing for determining a rotation abnormality. That is, when the rotating position of the output gear 74 rotated by the stepping motor 20 is a position in the dead zone of the potentiometer 75 where the potentiometer 75 cannot read the rotating position, the command unit 51A can function as the rotation-abnormality-determination limiting unit and apply limitation not to execute the rotation abnormality determination.

Figure 8:
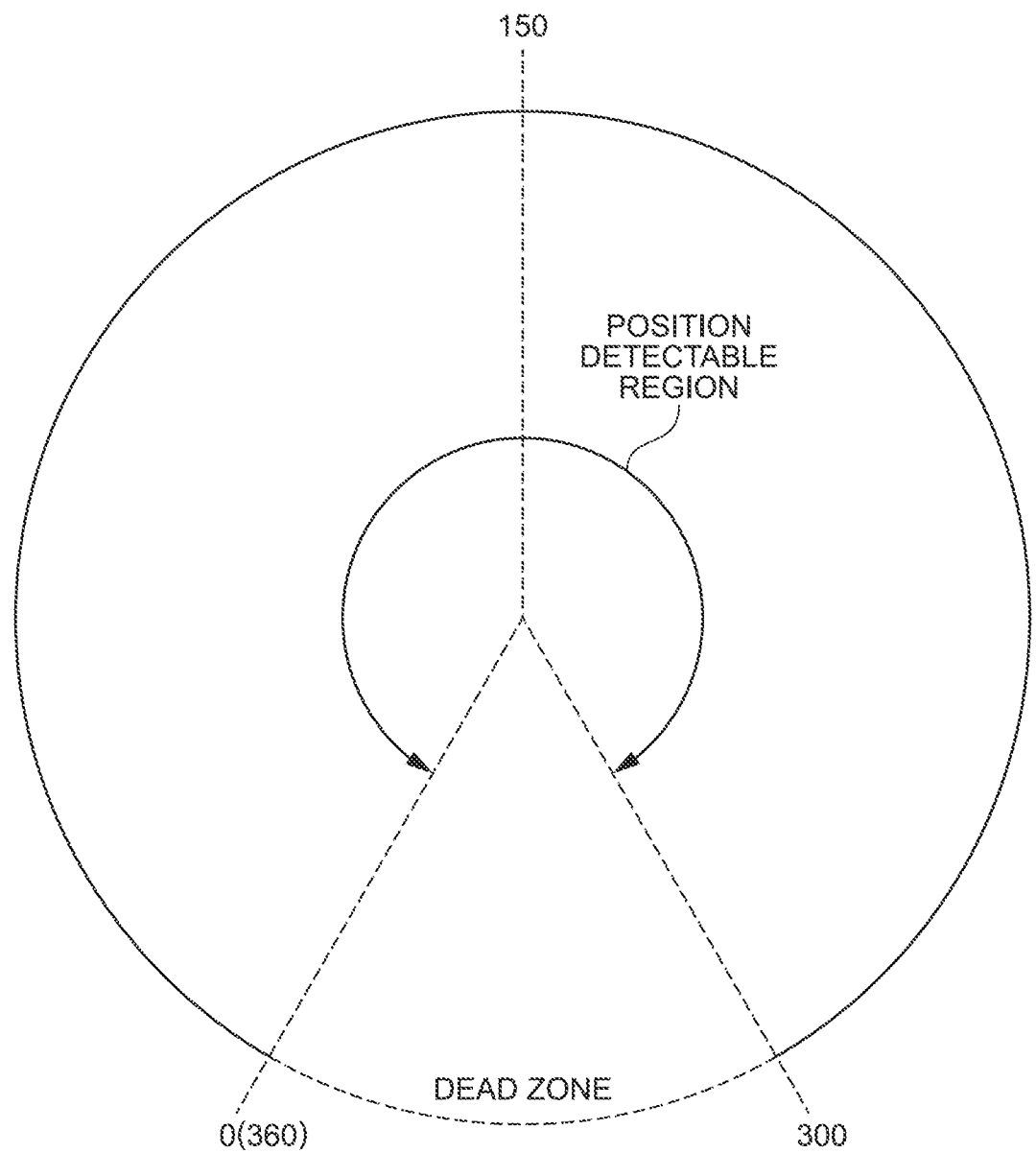
FIG. 8 is a diagram for explaining a dead zone of a potentiometer.

FIG. 8 is a diagram for explaining the dead zone of the potentiometer 75. The dead zone of the potentiometer 75 is explained. In the rotation abnormality determination in the rotary apparatus 1 in this embodiment, the first position information and the second position information compared by the second comparing unit 59 are values obtained by AD-converting a voltage corresponding to the rotating position input from the potentiometer 75. As shown in FIG. 8, a region called a dead zone, that is, a region where a voltage cannot be measured in a part of all rotating positions is present in the potentiometer 75. In the dead zone, the potentiometer 75 cannot read the rotating position. Therefore, even if it is attempted to perform the rotation abnormality determination when the rotating position of the output gear 74 is located in the dead zone of the potentiometer 75, the rotation abnormality determination cannot be accurately executed. Therefore, in normal control, the rotating position is not set as a rotatable region.

The rotary apparatus 1 in this embodiment stores, in the dead zone memory 63, information concerning the dead zone of the potentiometer 75 (information indicating which region of the rotating position the dead zone is), refers to the dead zone memory 63, and sets all the rotating positions as the rotatable region while applying limitation not to perform the rotation abnormality determination if the rotating position of the output gear 74 is a position in the dead zone of the potentiometer 75. Note that, in FIG. 8, a region between a rotating position "300" and a rotating position "360 (=0)" is the dead zone. Therefore, a position detectable region is from a rotating position exceeding "0" to a rotating position "300".

During a power supply start, the fifth comparing unit 64 receives the command from the command unit 51A, compares the position information (the ADC value) acquired from the AD converter 52 and a predetermined value defined as an abnormal value, and passes a result of the comparison to the command unit 51A. The abnormal value is a value acquired from the AD converter 52 when the potentiometer 75 cannot acquire a value and is a value indicating that the rotating position of the output gear 74 is the dead zone of the potentiometer 75. For example, the position information acquired from the AD converter 52 is a value such as "0".

The command unit 51A determines, based on the comparison result received from the fifth comparing unit 64, whether the position information acquired from the AD converter 52 is the abnormal value. When the position information acquired from the AD converter 52 during the power supply start is the abnormal value, the command unit 51A can determine that the position information acquired from the AD converter 52 indicates that the rotating position of the output gear 74 is a position in the dead zone of the potentiometer 75 and notify the host controller that an initial position abnormality has occurred. That is, the command unit 51A can function as the initial-position-abnormality determining unit, when the position information acquired from the AD converter (an example of the position-information acquiring unit) 52 during the power supply start indicates that the rotating position of the output gear 74 is a position in the dead zone of the potentiometer 75, determine that an initial position abnormality has occurred, and notify the initial position abnormality to the host controller (an example of the outside).

The operation during the power supply start of the control device 10 for the rotary apparatus 1 in the third embodiment explained above is explained.

Figure 9:
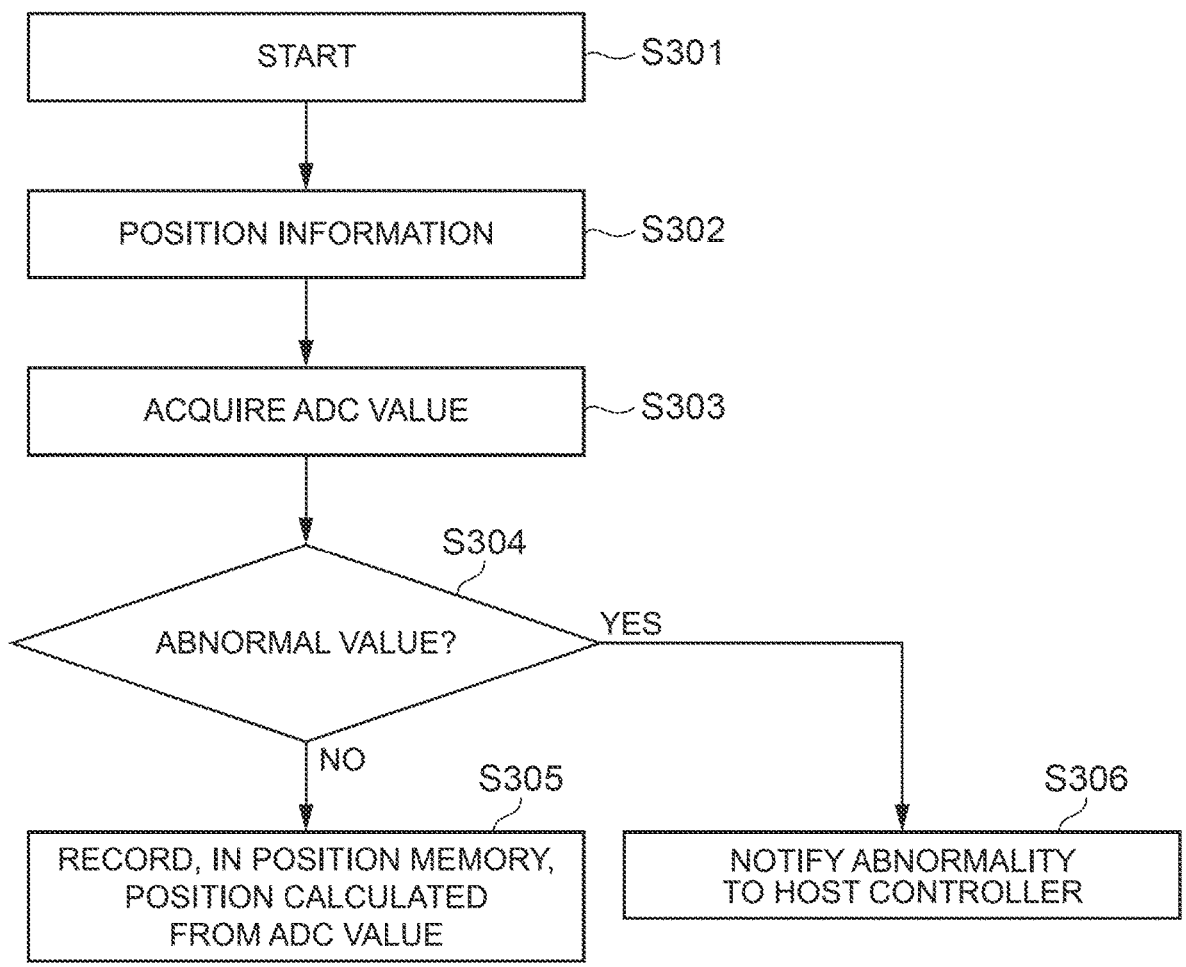
FIG. 9 is a flowchart showing a flow of an initial setting operation during a power supply start in a control device for a rotary apparatus.
Figure 10:
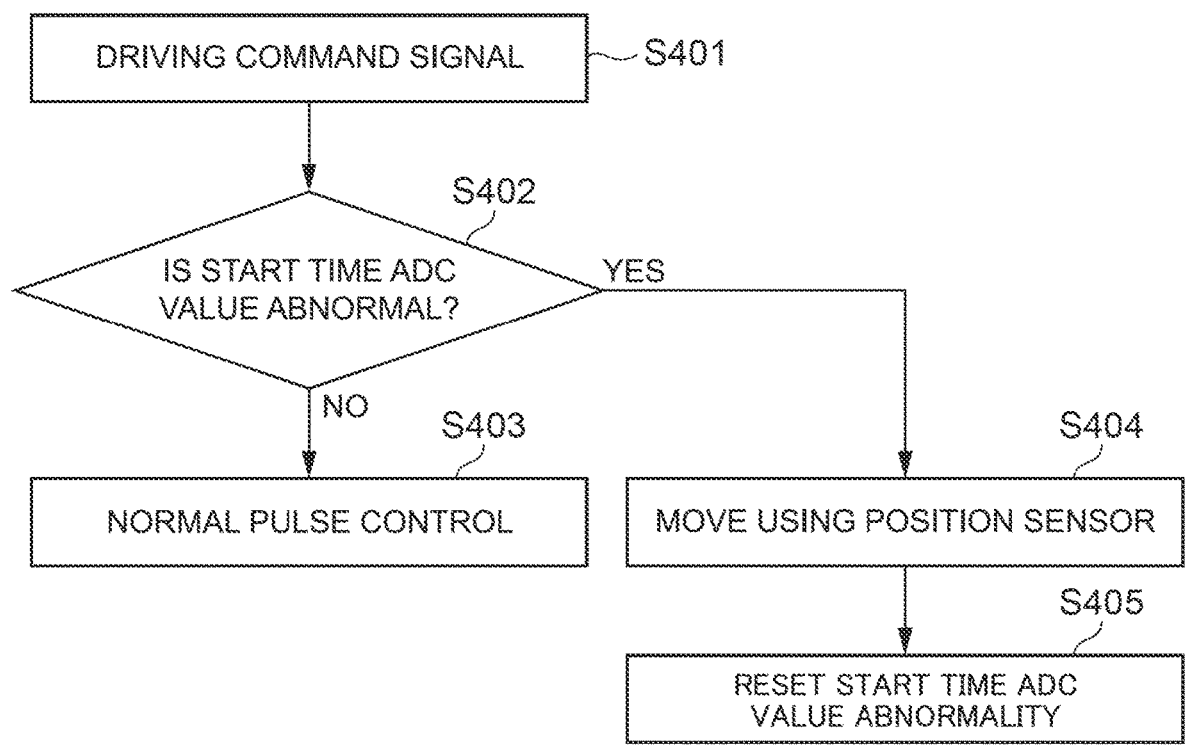
FIG. 10 is a flowchart showing a flow of operation according to a first driving command after the power supply start in the control device for the rotary apparatus.

FIG. 9 is a flowchart showing a flow of an initial setting operation during the power supply start in the control device 10 for the rotary apparatus 1. FIG. 10 is a flowchart showing a flow of operation for a first driving command after the power supply start in the control device 10 for the rotary apparatus 1.

First, as shown in FIG. 9, when the control device 10 for the rotary apparatus 1 is turned on (step S301), the AD converter 52 acquires a voltage (position information) corresponding to a rotating position input from the potentiometer 75 (step S302) and passes a value (a start time ADC value) AD-converted as initial position information to the fifth comparing unit 64 (step S303). The fifth comparing unit 64 compares the initial position information (the start time ADC value) and an abnormal value (a value indicating that the rotating position of the output gear 74 is a position in the dead zone of the potentiometer 75). The command unit 51A receives a result of the comparison. The command unit 51A functions as the initial-position-abnormality determining unit and determines whether the initial position information is the abnormal value (step S304).

If the initial position information is not the abnormal value (No in step S304), the command unit 51A records, in the position memory 55, a position calculated from the initial position information (the start time ADC value) (step S305). On the other hand, if the initial position information is the abnormal value (Yes in step S304), the command unit 51A notifies the outside such as the host controller that the position information acquired during the power supply start indicates that the rotating position of the output gear 74 is present in a position in the dead zone of the potentiometer 75 (an initial position abnormality has occurred) (step S305).

In this way, when the position information acquired from the AD converter 52 during the power supply start indicates that the rotating position of the output gear 74 is located in the dead zone of the potentiometer 75, the command unit 51A can notify the host controller to that effect. Therefore, the host controller can learn that the command unit 51A has failed in correctly acquiring the position information from the AD converter 52 during the power supply start.

Subsequently, as shown in FIG. 10, when receiving a first driving command signal after the power supply start (step S401), the command unit 51A determines whether the start time ADC value output from the AD converter 52 is abnormal (an initial position abnormality) (step S402). If the start time ADC value output from the AD converter 52 is not abnormal (No in step S402), the command unit 51A executes normal driving control based on a driving target included in the driving command signal (step S403). In the normal driving control, the command unit 51A executes the driving control by outputting driving pulses of a pulse number necessary for moving to the driving target.

If the start time ADC value output from the AD converter 52 is abnormal (Yes in step S402), unlike the normal driving control, the command unit 51A moves a rotating position of the stepping motor 20 using the potentiometer 75 (the position sensor) (step S404). Specifically, in the processing in step S404, the driving-pulse output unit 61 outputs driving pulses until an ADC value output from the AD converter 52 is not an abnormal value any more to thereby move the rotating position of the stepping motor 20. At this time, the stepping motor 20 rotates until the rotating position of the output gear 74 is in the position detectable region of the potentiometer 75. That is, when the command unit 51A receives a first driving command signal after the power supply start after it is determined that the initial position abnormality has occurred, the driving-pulse output unit 61 outputs, instead of driving pulses in a number corresponding to a driving target included in the driving command signal, driving pulses until position information based on a rotating position read by the potentiometer 75 can be acquired in the AD converter 52.

When the rotating position of the output gear 74 rotates to the position detectable region of the potentiometer 75, the command unit 51A resets the start time ADC value abnormality (step S405). At this time, the command unit 51A can record, in the position memory 55, as a current rotating position of the output gear 74, a position calculated from an ADC value output from the AD converter 52 after the movement of the potentiometer 75 to the position detectable region. After the recording in the position memory 55, a normal driving operation can be performed.

In this way, even when the position information output from the AD converter 52 acquired during the power supply start indicates that the rotating position of the output gear 74 is located in the dead zone of the potentiometer 75, the command unit 51A can perform the normal driving operation after moving the rotating position of the output gear 74 to the position detectable region of the potentiometer 75 according to the driving command signal and acquiring position information. That is, even when, as a result of the output gear 74 being driven based on the driving target equivalent to the dead zone of the potentiometer 75 before the power supply start, the rotating position of the output gear 74 during the power supply start is located in the dead zone of the potentiometer 75, the driving operation can be started without a problem. Therefore, the rotating position equivalent to the dead zone of the potentiometer 75 can also be included in the rotatable region.

The operation of the control device 10 for the rotary apparatus 1 in the third embodiment explained above is explained.

Figure 11:
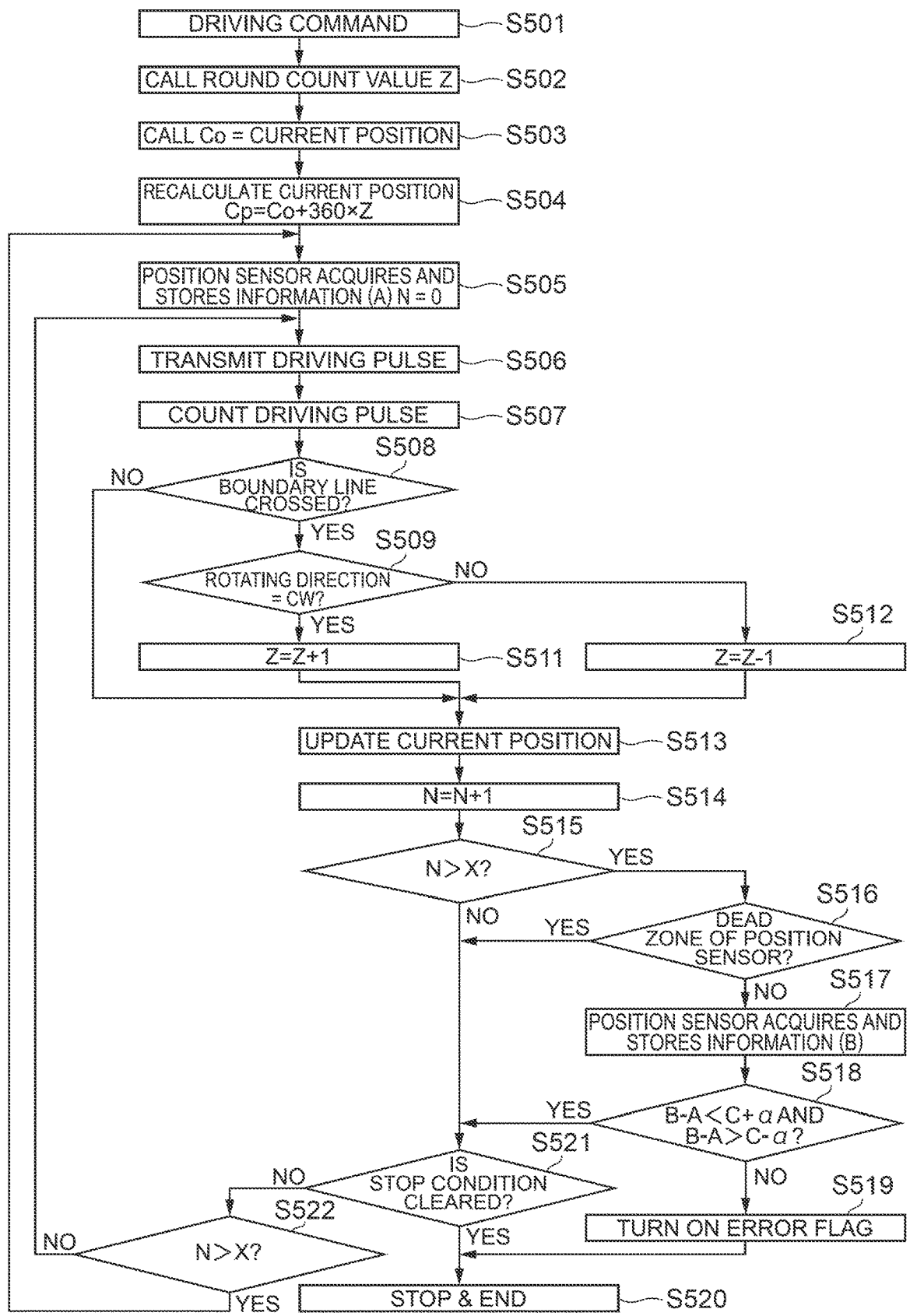
FIG. 11 is a flowchart for explaining the operation of the control device for the rotary apparatus in the third embodiment.

FIG. 11 is a flowchart for explaining the operation of the control device 10 for the rotary apparatus 1 in the third embodiment. In the control device 10 for the rotary apparatus 1 in this embodiment, the command unit 51A receives a driving command signal (a command) from the host controller (step S501) to thereby start the operation shown in FIG. 11.

Note that a control method for the rotary apparatus 1 in this embodiment includes a driving-pulse output step of repeatedly outputting, to the driving circuit 40 that applies a driving voltage to the stepping motor 20 that rotates the output gear 74 of the rotary apparatus 1, driving pulses by the number of times corresponding to a driving target, a position-information acquiring step of acquiring, at predetermined repetition timing of the driving-pulse output step, position information from the potentiometer 75 that reads a rotating position of the output gear 74, a dead-zone determining step of determining whether the rotating position of the output gear 74 rotated by the stepping motor 20 is a position in the dead zone of the potentiometer 75 where the potentiometer 75 cannot read the rotating position, and a rotation-abnormality determining step of, only when it is determined in the dead-zone determining step that the rotating position of the output gear 74 is not the position in the dead zone of the potentiometer 75, determining, based on the position information acquired in the position-information acquiring step, whether a rotation abnormality has occurred in the rotary apparatus 1.

When receiving the driving command signal from the host controller, first, prior to transmission processing for driving pulses, the command unit 51A performs various setting operations for appropriately performing rotation abnormality detection. Specifically, the command unit 51A calls a round count value Z from the position memory 55 (step S502), calls a position count value Co (step S503), and recalculates a current position of the output gear 74 (step S504). The recalculation of a current position Cp can be calculated by the position count value Co+360×the round count value Z.

Thereafter, the command unit 51A instructs the AD converter 52 to acquire current position information read by the potentiometer 75. The AD converter 52 acquires, as a reference position, the position information (an example of the first position information) A read by the potentiometer 75 and stores the acquired position information "A" in the "A" memory 53 (step S505). At timing of step S505, the "N" counter 56 receives a reset command from the command unit 51A and resets a value of the "N" counter to 0.

Subsequently to step 505, the driving-pulse output unit 61 receives a transmission command for an output pulse from the command unit 51A and transmits a driving pulse to the motor driving unit 41 of the driving circuit 40 (step S506; the driving-pulse output step). Consequently, the stepping motor 20 is applied with a driving voltage by the motor driving unit 41 and controlled to be driven.

Subsequently to step S506, the pulse counter 54 receives a count command for an output pulse from the command unit 51A, increments a counter (step S507), and passes an incremented pulse count value to the position memory 55 and the round counter 65.

The round counter 65 refers to a current rotating position (position count value) of the output gear 74 stored in the position memory 55 and adds the pulse count value received from the pulse counter 54 to the position count value to thereby determine whether the wiper of the potentiometer 75 has crossed a boundary line (a reference position) of one rotation (step S508). When the wiper of the potentiometer 75 has crossed the boundary line (Yes in step S508), the round counter 65 further determines whether a rotating direction of the potentiometer 75 is the forward direction (step S509). When determining that the rotating direction of the potentiometer 75 is the forward direction (Yes in step S509), the round counter 65 increments the round count value Z by 1 (step S511). When determining that the rotating direction of the potentiometer 75 is the opposite direction (No in step S509), the round counter 65 decrements the round count value Z by 1 (step S512) and passes the round count value Z to the position memory 55.

When receiving the incremented pulse count value and the incremented round count value, the position memory 55 updates the current position (position count value) of the output gear 74 based on the position recalculated in step S504 and the received pulse count value and the received round count value (step S513). Consequently, the position count value is updated until the position count value reaches the driving target (the target count value).

Subsequently to step S513, the "N" counter 56 receives a count command of the "N" counter from the command unit 51A and increments the N counter value (step S514; the position-information acquiring step). Consequently, the N counter value is a value reflecting the number of times of transmission of driving pulses at every predetermined rotation abnormality determination interval.

Subsequently to step S514, the first comparing unit 57 receives a comparison command from the command unit 51A, compares the N counter value of the "N" counter 56 and the X value held in the "X" memory 58 (determines whether the N counter value>the X value) (step S515), and passes a result of the comparison to the command unit 51A. Consequently, the first comparing unit 57 compares the X value serving as a reference for timing for determining a rotation abnormality of the rotary apparatus 1 and the N counter value reflecting the number of times of transmission of driving pulses. Therefore, the first comparing unit 57 can determine timing of rotation abnormality determination that should be executed at the predetermined rotation abnormality determination interval.

When receiving a comparison result that the N counter value is larger than the X value (Yes in step S515), the command unit 51A determines that this timing is the predetermined rotation abnormality determination interval and further determines, based on a comparison result received from the fourth comparing unit 62, whether the rotating position of the output gear 74 is a position in the dead zone of the potentiometer 75 (step S516; the dead-zone determining step). When determining that the rotating position of the output gear 74 is not a position in the dead zone of the potentiometer 75 (No in step S516), the command unit 51A executes the rotation abnormality determination processing. Specifically, the command unit 51A requests the AD converter 52 to acquire current position information and gives a comparison command to the second comparing unit 59. When receiving the comparison command from the command unit 51A, the second comparing unit 59 acquires the position information "A" stored in the "A" memory 53 and the current position information (an example of the second position information) B acquired by the AD converter 52 (step S517). Subsequently to step S517, the second comparing unit 59 calculates the difference D between the position information "A" and the position information B (=B−A or =A−B), compares values ((C−α) and (C+α)) obtained by adjusting, with the tolerance value α, the ideal difference C held in advance and the calculated difference D (step S518; the rotation-abnormality determining step), and passes a result of the comparison to the command unit 51A. Note that any value can be set as the tolerance value α. The absolute value of −α and +α may be set to a different value. The ideal difference C is a value obtained by multiplying the number of driving pulses output between execution time of the rotation abnormality determination processing of the last time and execution time of the rotation abnormality determination processing of this time by a change amount of a rotating position for each of unit driving pulses.

When obtaining a comparison result that the calculated difference D is outside a range of the value obtained by adjusting the ideal difference C with the tolerance value α((C−α)<D<(C+α) is not satisfied) (No in S518), the command unit 51A determines that a rotation abnormality has occurred in the rotary apparatus 1 and turns on the error flag (step S519) and causes the driving-pulse output unit 61 to stop the output of the driving pulse. Consequently, the driving of the stepping motor 20 stops (step S520). Note that the processing for turning on the error flag in step S519 can be omitted.

The rotation abnormality determination processing is further explained with reference to FIG. 5. FIG. 5 is a diagram for explaining the rotation abnormality determination. In an example shown in FIG. 5, the number of command pulses in one driving of the stepping motor 20 output according to a driving command signal is 20 pulses, a predetermined rotation abnormality determination interval of pulses is 10 pulses (that is, the X value is nine), and the tolerance value is a. Note that this example only indicates an example of numerical values and is not limited to this example.

In FIG. 5, the number of command pulses to the stepping motor 20 is shown on the horizontal axis and a position sensor output value (a value of position information output from the potentiometer 75) is shown on the vertical axis. A counter N for determination (an N counter value), rotation abnormality determination timing, and movement start timing are shown along the horizontal axis. In this example, it is seen that the N counter value is updated at every 10 counts and determination timing comes at every 10 pulses (counts). This figure indicates that position information A1, A2, and A3 serving as reference positions are stored in the "A" memory 53 as first position information. Position information B1, B2, and B3 indicate ideal second position information respectively corresponding to the position information A1, A2, and A3.

In the control device 10 for the rotary apparatus 1 in this embodiment, at normal time, as indicated by a graph of an output value transition example at the normal time shown in FIG. 5, an output value (a value of position information) of the potentiometer 75 increases in proportion to an increase in the number of driving pulses. However, when a rotation abnormality has occurred, the output value shows a value deviating from this graph.

In the following explanation, at determination timing of a thirtieth step, as an example, "Ba" is acquired as current position information B and, as another example, "Bb" is acquired as the current position information B.

In this case, at determination timing immediately preceding the determination timing of the thirtieth step, the position information A3 serving as the reference position is stored in the "A" memory 53 as the first position information. Therefore, when "Ba" is acquired as the current position information (an example of the second position information) B, a difference D1 is Ba−A3. The difference D1 is within a range of a value obtained by adjusting the ideal difference C with the tolerance value α. Therefore, in this case, it is not determined that a rotation abnormality has occurred.

On the other hand, when "Bb" is acquired as the current position information (an example of the second position information) B, the difference D1 is Bb−A3. The difference D2 is outside the range of the value obtained by adjusting the ideal difference C with the tolerance value α. Therefore, in this case, the current position information B is considered to not reach "B3", which is a position corresponding to the number of output pulses. It is determined that a rotation abnormality has occurred. That is, the command unit 51A functions as the rotation-abnormality determining unit. When the difference D between the first position information acquired last time by the AD converter (an example of the position-information acquiring unit) 52 and the second position information acquired this time by the AD converter 52 is different from the ideal difference C by the tolerance value α or more, the command unit 51A determines that a rotation abnormality has occurred in the rotary apparatus 1.

On the other hand, when receiving the comparison result that the N counter value is not larger than the X value in step S515 in FIG. 11 (No in S515), the command unit 51A can determine that it is not timing for rotation abnormality determination. Similarly, when determining, based on the comparison result received from the fourth comparing unit 62, that the rotating position of the output gear 74 is a position in the dead zone of the potentiometer 75 (Yes in step S516), the command unit 51A can determine that it is not the timing for the rotation abnormality determination. When obtaining a comparison result that the calculated difference D is within the range of values obtained by adjusting the ideal difference C with the tolerance value α(($C-α$)<D<(C+α)) (Yes in S518), as a result of the rotation abnormality determination, the command unit 51A can determine that an abnormality is absent. In these cases (No in S515, Yes in step S516, and Yes in S518), the command unit 51A gives a comparison command to the third comparing unit 60 in order to determine a stop condition. When receiving the comparison command, the third comparing unit 60 compares a target count value and a position count value in order to determine whether the stop condition is cleared (S521) and passes a result of the comparison to the command unit 51A.

When receiving a comparison result that the stop condition is cleared because the position count value reaches the target count value (Yes in S521), the command unit 51A ends the transmission of the driving pulse (S520).

When receiving a comparison result that the stop condition is not cleared because the position count value does not reach the target count value (No in S521), the command unit 51A determines, according to whether the comparison result received in step S515 indicates "the N counter value>the X value", whether it is the timing for the rotation abnormality determination (S522). When determining as a result of the determination in step S522 that it is the timing for the rotation abnormality determination (Yes in S522), the command unit 51A returns to the processing in step S503. When determining as a result of the determination in step S522 that it is not the timing for the rotation abnormality determination (No in S522), the command unit 51A returns to the processing in step S506.

With the control device for the rotary apparatus, the rotary apparatus, and the control method for the rotary apparatus in this embodiment, the control of the rotating position of the stepping motor is performed by open control based on a driving command signal as in the past. That is, since the position information by the position sensor is not used as position information in normal motor driving, the high position accuracy and the high resolution in the stepping motor in the past are not spoiled. On the other hand, the position information may be information in a degree enough for discriminating whether the output gear physically moves. High accuracy position detection of a position sensor used for the normal position detection is unnecessary. An inexpensive position sensor with rough accuracy can be used. Therefore, the position sensor can be realized at low cost.

Although the dead zone where position information cannot be acquired is present in the range of one rotation of the position sensor, all the rotating positions and a rotating position exceeding one rotation (360 degrees) of the position sensor can also be included in the movable region. Therefore, it is also possible to enlarge a movable region compared with the rotary apparatus in the past.

Fourth Embodiment

A control device for a rotary apparatus, the rotary apparatus, and a control method for the rotary apparatus in a fourth embodiment are explained. In the third embodiment, the command unit 51A performs the rotation abnormality determination at the predetermined rotation abnormality determination interval. However, this embodiment is different from the third embodiment in that, after performing driving to "stop condition cleared" set as a driving target, the command unit 51A performs the rotation abnormality determination. In the fourth embodiment, concerning the components other than the command unit 51A, a control device for a rotary apparatus and the rotary apparatus having configurations similar to the configurations in the third embodiment can be adopted. Concerning the fourth embodiment, only components different from the components in the third embodiment are explained. Explanation about components common to the third embodiment is omitted.

Figure 12:
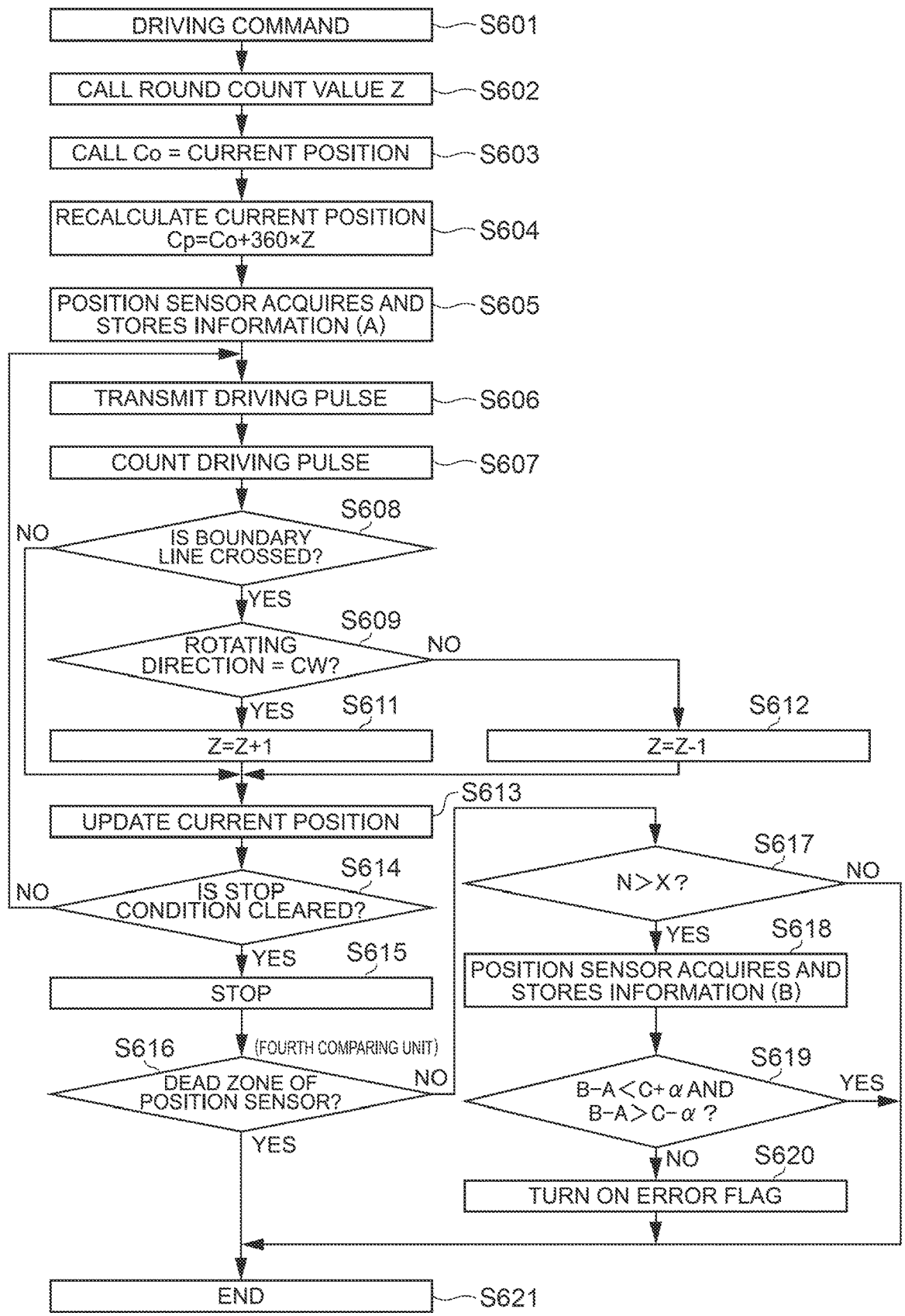
FIG. 12 is a flowchart for explaining the operation of a control device for a rotary apparatus in a fourth embodiment.

FIG. 12 is a flowchart for explaining the operation of the control device 10 for the rotary apparatus 1 in the fourth embodiment. The operation of the control device 10 for the rotary apparatus 1 in the fourth embodiment is explained with reference to FIGS. 7 and 12. In the control device 10 for the rotary apparatus 1 in the fourth embodiment, processing similar to the processing in step S501 to step S513 in the third embodiment is performed in step S601 to step S613 in FIG. 12. Processing similar to the processing in step S517 to step S520 in the third embodiment is performed in step S618 to step S621 in FIG. 12.

In this embodiment, transmission of a driving pulse (S606) to update of a current position (S613) are repeated until a stop condition is cleared (Yes in S614).

When determining that the stop condition is cleared (Yes in S614), the command unit 51A stops the driving of the stepping motor 20 (S615) and further determines, based on the comparison result received from the fourth comparing unit 62, whether the rotating position of the output gear 74 is present in a position in the dead zone of the potentiometer 75 (step S616). When determining that the rotating position of the output gear 74 is not a position in the dead zone of the potentiometer 75 (No in step S616), the command unit 51A determines whether the determination condition is satisfied (step S617). Specifically, the first comparing unit 57 receives a comparison command with the command unit 51A, compares the N counter value of the "N" counter 56 and the X value of the "X" memory 58, and returns a result of the comparison to the command unit 51A. When the N counter value is larger than the X value, the command unit 51A determines that the determination condition is satisfied. When determining that the rotating position of the output gear 74 is a position in the dead zone of the potentiometer 75 (Yes in step S616), the command unit 51A ends the driving processing without executing the rotation abnormality determination processing.

In this embodiment, in step S605, position information at timing of an output start of a driving pulse is acquired. The acquired position information (an example of the third position information) "A" is stored in the "A" memory 53 as information concerning a reference position. Concerning the rotation abnormality determination processing, in step S618, position information (an example of the fourth position information) B at timing of an output end of the driving pulse is acquired. In step S619, the rotation abnormality determination is performed by calculating the difference D between the position information B and the position information "A" stored in the "A" memory 53 and comparing the difference D.

In this embodiment, when the number of driving pulses is too small, accuracy of the rotation abnormality determination is deteriorated. Therefore, it is possible to avoid the deterioration in the accuracy of the rotation abnormality determination with processing for determining whether to execute the rotation abnormality determination in step S617. However, when the control device 10 for the rotary apparatus 1 is used for a use in which the number of driving pulses per one driving of the stepping motor 20 output according to the driving command signal is sufficiently large, the processing in step S617 is not always necessary. In this case, the "N" counter 56, the first comparing unit 57, and the "X" memory 58 of the control device 10 shown in FIG. 7 can be omitted.

In the embodiment explained above, a specific example is explained about the control method for the rotary apparatus 1 using the rotary apparatus 1 having the configuration shown in FIGS. 1 to 3 and FIG. 7. The control method for the rotary apparatus 1 in this embodiment only has to include a driving-pulse output step of repeatedly outputting, to the driving circuit 40 that applies a driving voltage to the stepping motor 20 that rotates the output gear 74 of the rotary apparatus 1, driving pulses by the number of times corresponding to a driving target, a position-information acquiring step of acquiring, at predetermined repetition timing of the driving-pulse output step, position information from the potentiometer 75 (an example of the position sensor) that reads a rotating position of the output gear 74, and a rotation-abnormality determining step of determining, based on the position information acquired in the position-information acquiring step, whether a rotation abnormality has occurred in the rotary apparatus 1. The control method for the rotary apparatus 1 is not limited by a specific embodiment.

Modification of the Embodiments

In the embodiments explained above, the configuration of the control device 10 is not limited to the configuration shown in FIG. 1, the configuration of the driving control unit 50 is not limited to the configuration shown in FIG. 2, and the configuration of the rotary apparatus is not limited to the configurations shown in FIGS. 3 and 7.

Figure 13:
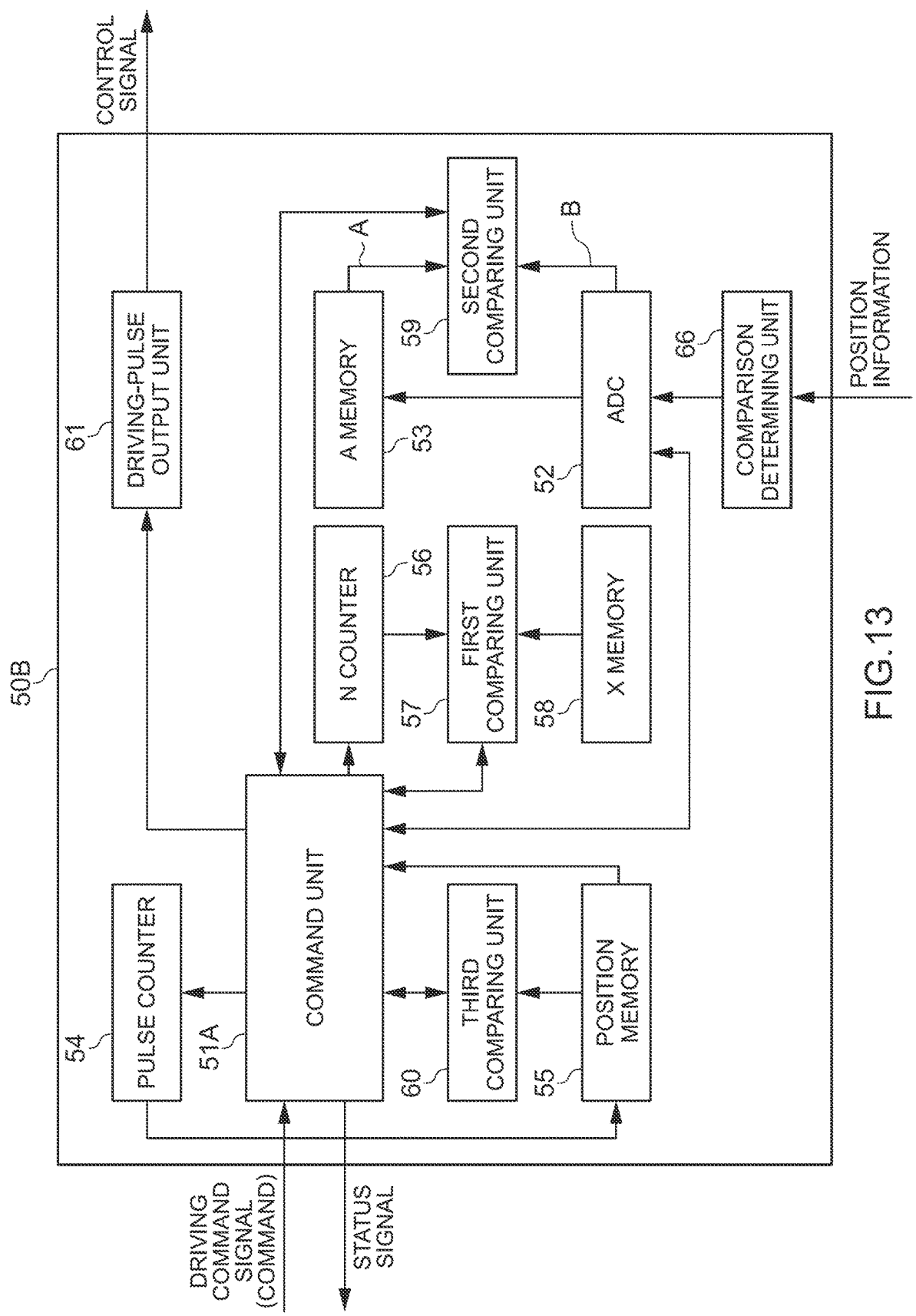
FIG. 13 is a diagram showing a modification of the configuration of functional blocks realized by a driving control unit of a control circuit.

As a specific example, a modification of the driving control unit in the third embodiment and the fourth embodiment is explained. FIG. 13 is a diagram showing a modification of the configuration of functional blocks realized by a driving control unit 50B of the control circuit 30. The rotation abnormality determination can also be limited by providing a comparison determining unit 66 (an example of the rotation-abnormality-determination limiting unit) before the AD converter 52 as shown in FIG. 13 instead of the fourth comparing unit 62 connected to the command unit 51A in FIG. 7. In this case, if the comparison determining unit 66 does not output a signal to the AD converter 52 when the rotating position of the output gear 74 driven by the driving pulse is a position in the dead zone of the potentiometer 75 where the potentiometer 75 cannot read the rotating position, the comparison processing in the second comparing unit 59 substantially cannot be performed. Therefore, the execution of the rotation abnormality determination processing can be limited.

For example, a memory storing information concerning the position detectable region may be used instead of the dead zone memory 63 storing the information concerning the dead zone of the potentiometer 75 in FIG. 7. Processing in this case is different from the processing based on the determination result determined using the dead zone memory 63 in the determination processing in the fourth comparing unit 62. That is, processing at the time when the determination result is Yes and processing at the time when the determination result is No are opposite.

In the embodiments explained above, the processing flows shown in FIGS. 4, 6, and 9 to 12 are specific examples. Processing flows are not limited to these processing flows.

In the example explained in the embodiments, the potentiometer 75 is used as the unit that reads the position information. However, the unit that reads the position information is not limited to the potentiometer 75 and may be, for example, a magnetic sensor if the magnetic sensor is a position sensor that physically reads a rotating position of a gear.

What is claimed is:
1. A control device for a rotary apparatus comprising:
a driving circuit configured to apply a driving voltage to a stepping motor that rotates an output gear of the rotary apparatus; and
a control circuit configured to output, to the driving circuit, driving pulses in a number corresponding to a driving target included in a driving command signal from an outside, wherein
the control circuit includes:
a driving-pulse output unit configured to output the driving pulses in the number corresponding to the driving target included in the driving command signal;
a position-information acquiring unit configured to acquire position information from a position sensor that reads a rotating position of the output gear of the rotary apparatus; and
a rotation-abnormality determining unit configured to determine, based on the position information acquired by the position-information acquiring unit, whether a rotation abnormality has occurred in the rotary apparatus,
wherein the position-information acquiring unit acquires, every time the number of the driving pulses output by the driving-pulse output unit reaches a predetermined value, the position information from the position sensor that reads the rotating position of the output gear of the rotary apparatus.
2. The control device for the rotary apparatus according to claim 1, wherein, when a difference D between first position information acquired last time by the position-information acquiring unit and second position information acquired this time by the position-information acquiring unit is different from an ideal difference C by a tolerance value α or more, the rotation-abnormality determining unit determines that the rotation abnormality has occurred in the rotary apparatus.
3. The control device for the rotary apparatus according to claim 1, wherein the position sensor is a potentiometer that outputs, as the position information, a voltage corresponding to the rotating position.
4. The control device for the rotary apparatus according to claim 1, wherein the control circuit includes:
a first counter configured to count the number of the driving pulses output by the driving-pulse output unit;
a first memory configured to store the predetermined value;
a comparator configured to compare a value counted by the first counter and the predetermined value stored in the first memory; and
a command unit configured to, as a result of the comparison by the comparator, when the counted value is larger than the predetermined value, determine that the num- ber of the driving pulses reaches the predetermined value and give commands to the units of the control circuit.

5. A rotary apparatus comprising:
a stepping motor driven to be rotated by the control device for the rotary apparatus according to claim 1;
an output gear configured to interlock with a rotary motion of the stepping motor and rotate; and
the position sensor configured to detect a rotating position of the output gear.

6. A control device for a rotary apparatus comprising:
a driving circuit configured to apply a driving voltage to a stepping motor that rotates an output gear of the rotary apparatus; and
a control circuit configured to output, to the driving circuit, driving pulses in a number corresponding to a driving target included in a driving command signal from an outside, wherein
the control circuit includes:
　a driving-pulse output unit configured to output the driving pulses in the number corresponding to the driving target included in the driving command signal;
　a position-information acquiring unit configured to acquire position information from a position sensor that reads a rotating position of the output gear of the rotary apparatus; and
　a rotation-abnormality determining unit configured to determine, based on the position information acquired by the position-information acquiring unit, whether a rotation abnormality has occurred in the rotary apparatus,
wherein
　the position-information acquiring unit acquires, at timing of each of an output start and an output end of the driving pulse in the driving-pulse output unit, the position information from the position sensor that reads the rotating position of the output gear of the rotary apparatus, and
　when the difference D between third position information acquired by the position-information acquiring unit at the timing of the output start of the driving pulse and fourth position information acquired by the position-information acquiring unit at the timing of the output end of the driving pulse is different from the ideal difference C by the tolerance value $\alpha$ or more, the rotation-abnormality determining unit determines that the rotation abnormality has occurred in the rotary apparatus.

7. A control device for a rotary apparatus comprising:
a driving circuit configured to apply a driving voltage to a stepping motor that rotates an output gear of the rotary apparatus; and
a control circuit configured to output, to the driving circuit, driving pulses in a number corresponding to a driving target included in a driving command signal from an outside, wherein
the control circuit includes:
　a driving-pulse output unit configured to output the driving pulses in the number corresponding to the driving target included in the driving command signal;
　a position-information acquiring unit configured to acquire position information from a position sensor that reads a rotating position of the output gear of the rotary apparatus; and
　a rotation-abnormality determining unit configured to determine, based on the position information acquired by the position-information acquiring unit, whether a rotation abnormality has occurred in the rotary apparatus,
wherein the control circuit further includes an output stop unit configured to stop the output of the driving pulse in the driving-pulse output unit when the rotation-abnormality determining unit determines that the rotation abnormality has occurred in the rotary apparatus.

8. A control device for a rotary apparatus comprising:
a driving circuit configured to apply a driving voltage to a stepping motor that rotates an output gear of the rotary apparatus; and
a control circuit configured to output, to the driving circuit, driving pulses in a number corresponding to a driving target included in a driving command signal from an outside, wherein
the control circuit includes:
　a driving-pulse output unit configured to output the driving pulses in the number corresponding to the driving target included in the driving command signal;
　a position-information acquiring unit configured to acquire position information from a position sensor that reads a rotating position of the output gear of the rotary apparatus; and
　a rotation-abnormality determining unit configured to determine, based on the position information acquired by the position-information acquiring unit, whether a rotation abnormality has occurred in the rotary apparatus,
further comprising a rotation-abnormality-determination limiting unit configured to, when the rotating position of the output gear driven by the driving pulse is a position in a dead zone where the position sensor cannot read the rotating position, limit the determination in the rotation-abnormality determining unit not to be executed.

9. The control device for the rotary apparatus according to claim 8, wherein
the control circuit further includes an initial-position-abnormality determining unit configured to, when the position information acquired from the position-information acquiring unit during a power supply start indicates that the rotating position of the output gear is a position in the dead zone of the position sensor, determine that an initial position abnormality has occurred, and
the control circuit notifies the initial position abnormality determined by the initial-position-abnormality determining unit to the outside.

10. The control device for the rotary apparatus according to claim 9, wherein, when the control circuit receives a first driving command signal after the power supply start, after the initial-position-abnormality determining unit determines that the initial position abnormality has occurred, the driving-pulse output unit outputs, instead of the driving pulses in the number corresponding to the driving target included in the driving command signal, driving pulses until the position-information acquiring unit can acquire position information based on a rotating position read by the position sensor in the position-information acquiring unit.

11. The control device for the rotary apparatus according to claim 8, further comprising:
a position memory storing a current position formed by a combination of the rotating position of the output gear of the rotary apparatus and a number of revolutions of the output gear of the rotary apparatus;
a pulse counter configured to count the number of the driving pulses output by the driving-pulse output unit and output a pulse count value; and
a round counter configured to output a round count value obtained by counting, from a current position of the position memory, according to the driving pulses equivalent to the pulse count value, a number of times of passage in a forward direction in a reference position in one rotation of the position sensor, wherein
the current position of the position memory is updated using the pulse count value and the round count value.

12. The control device for the rotary apparatus according to claim 11, wherein, in case of passage in an opposite direction in the reference position in the one rotation of the position sensor, the round counter counts down the round count value.

13. A control method for a rotary apparatus comprising:
a driving-pulse output step of repeatedly outputting, to a driving circuit that applies a driving voltage to a stepping motor that rotates an output gear of the rotary apparatus, driving pulses by a number of times corresponding to a driving target;
a position-information acquiring step of acquiring, at predetermined repetition timing of the driving-pulse output step, position information from a position sensor that reads a rotating position of the output gear of the rotary apparatus; and
a rotation-abnormality determining step of determining, based on the position information acquired in the position-information acquiring step, whether a rotation abnormality has occurred in the rotary apparatus,
further comprising a dead-zone determining step of, after the position-information acquiring step, determining whether the rotating position of the output gear driven by the driving pulse is a position in a dead zone of the position sensor where the position sensor cannot read the rotating position, wherein
the rotation-abnormality determining step is executed only when it is determined in the dead-zone determining step that the rotating position of the output gear is not the position in the dead zone of the position sensor.

* * * * *